United States Patent [19]
Sakai et al.

[11] Patent Number: 5,808,392
[45] Date of Patent: Sep. 15, 1998

[54] PERMANENT MAGNET TYPE ROTATING MACHINE

[75] Inventors: Kazuto Sakai; Yutaka Tabuchi, both of Tokyo, Japan

[73] Assignee: Kabushiki Kaisha Toshiba, Kawasaki, Japan

[21] Appl. No.: 429,755

[22] Filed: Apr. 27, 1995

[30] Foreign Application Priority Data

| Apr. 28, 1994 | [JP] | Japan | 6-092202 |
| May 20, 1994 | [JP] | Japan | 6-106357 |
| Aug. 10, 1994 | [JP] | Japan | 6-188429 |

[51] Int. Cl.$^6$ .................................................. H02K 21/12
[52] U.S. Cl. .......................... 310/214; 310/154; 310/156; 310/254; 310/261
[58] Field of Search ...................... 310/214, 261, 310/154, 156, 254

[56] References Cited

U.S. PATENT DOCUMENTS

| 3,870,912 | 3/1975 | Kipke et al. | 310/183 |
| 4,329,606 | 5/1982 | Montagu | 310/71 |
| 4,425,521 | 1/1984 | Rosenberry, Jr. et al. | 310/214 |
| 4,471,252 | 9/1984 | West | 310/154 |
| 4,547,713 | 10/1985 | Langley et al. | 318/254 |
| 4,645,961 | 2/1987 | Malsky | 310/156 |
| 4,758,751 | 7/1988 | Hosoya et al. | 310/41 |
| 4,827,235 | 5/1989 | Inomata et al. | 335/297 |
| 4,888,512 | 12/1989 | Shimizu | 310/156 |
| 4,893,040 | 1/1990 | Turner et al. | 310/156 |
| 4,918,831 | 4/1990 | Kliman | 29/598 |
| 5,230,751 | 7/1993 | Endoh et al. | 148/302 |
| 5,298,827 | 3/1994 | Sugiyama | 310/156 |
| 5,363,004 | 11/1994 | Futami et al. | 310/156 |
| 5,488,260 | 1/1996 | Heyraud | 310/156 |

FOREIGN PATENT DOCUMENTS

| 0096515 A1 | 12/1983 | European Pat. Off. . |
| 0544310 A2 | 6/1993 | European Pat. Off. . |
| 42-10571 | 6/1967 | Japan . |
| 60-91850 | 5/1985 | Japan . |
| 62-119175 | 7/1987 | Japan . |
| 1-103145 | 4/1989 | Japan . |
| 2-79738 | 3/1990 | Japan . |
| 5-284680 | 10/1993 | Japan . |

OTHER PUBLICATIONS

Jahns et al. "Interior Permanent–Magnet Synchronous Motors For Adjustable–Speed Drives", *IEEE Transactions on Industry Applications*, vol. 1A–22, No. 4, pp. 738–747, (Jul. 1986).

Bose, "A High–Performance Inverter–Fed Drive System Of An Interior Permanent Magnet Synchronous Machine", *IEEE Transactions on Industry Applications*, vol. 24, No. 6, pp. 987–997, (Dec. 1988).

Nikkei Mechanical, pp. 90–93, Oct. 18, 1993.

*Primary Examiner*—Thomas M. Dougherty
*Assistant Examiner*—Michael J. Wallace, Jr.
*Attorney, Agent, or Firm*—Foley & Lardner

[57] ABSTRACT

A permanent magnet type rotating machine includes a stator core provided on an inner periphery thereof with armature windings, a rotor core, a plurality of permanent magnets arranged on an outer periphery of the rotor core, and a magnetic ring arranged between the permanent magnets and a stator. The magnetic flux running from the permanent magnets to the stator core through a gap, can be increased by a reduction in magnetic reluctance due to the magnetic ring inserted between the gap and the permanent magnets. The magnetic ring is fitted on either one of the outer peripheries of the permanent magnets and the inner periphery of the stator core.

67 Claims, 19 Drawing Sheets

PHASE DIFFERENCE BET. INDUCED VOLTAGE AND CURRENT (°)

PHASE DIFFERENCE BET.
INDUCED AND CURRENT 0°

PHASE DIFFERENCE BET.
INDUCED AND CURRENT 60°

PHASE DIFFERENCE BET.
INDUCED AND CURRENT 90°

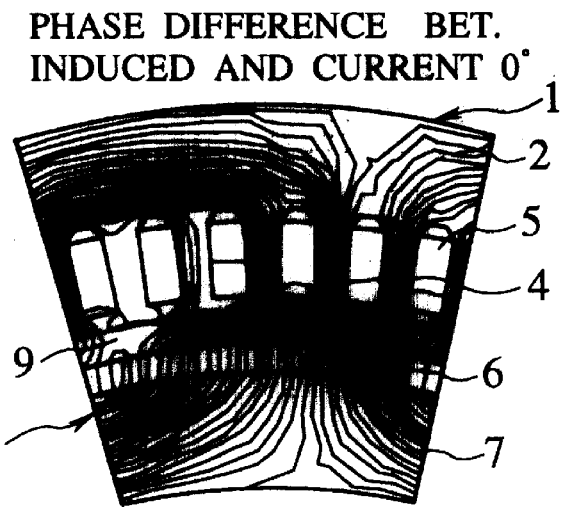
FIG.19A PHASE DIFFERENCE BET. INDUCED AND CURRENT 0°
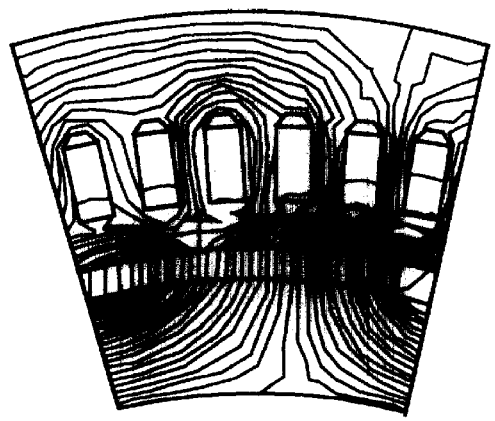
FIG.19B PHASE DIFFERENCE BET. INDUCED AND CURRENT 60°
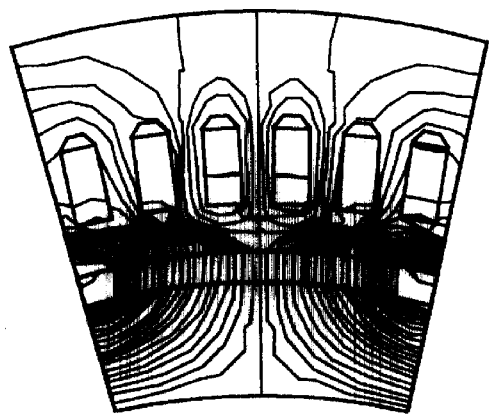
FIG.19C PHASE DIFFERENCE BET. INDUCED AND CURRENT 90°

FLUX BY D-AXIS CURRENT REACTION

FLUX OF PERMANENT MAGNET

PERMANENT MAGNET TYPE ROTATING MACHINE

BACKGROUND OF THE INVENTION

1. Field of the Invention

The present invention relates to a permanent magnet type rotating apparatus and, in particular, to a permanent magnet type rotating apparatus which is capable of rotating under operating condition of high temperature.

2. Background of Related Art

Conventional rotating machines include a permanent magnet type as shown in FIG. 1. In FIG. 1, reference numeral 1 designates a stator of a four-pole cage induction motor as the permanent magnet type rotating machine, 2 a stator core and 8A a rotor, respectively. The rotor 8A includes a rotor core 7 which extends along an axis thereof and which may be made of carbon steel (e.g., S45C: carbon steel of carbon content of 0.45 wt % in Japanese Industrial Standard Classification). Circularly arranged on an periphery of the rotor core 7 are four pieces of permanent magnets 6 which are made of material such as Nd(neodymium)-Fe (ferrite)-B(boron) alloy, Sm(samarium)-Co(cobalt) alloy and so on. The permanent magnets 6 are joined to each other by means of an adhesive agent. Similarly, they are also joined to the rotor core 7 by the adhesive agent.

The permanent magnets 6 consist of first magnets each of which is magnetized in such a manner that an outside portion thereof is a North pole while an inside portion thereof is a South pole and second magnets magnetized in such a manner that each outside portion thereof is a South pole while each inside portion thereof is a North pole. The first and second magnets are arranged to be adjacent to each other, alternately.

The stator 1 is provided on an inner periphery thereof with teeth 4 which project inwardly. Defined between the respective teeth 4 are respective slots 5 into which stator windings 3 are fitted in two stages. The teeth 4 and the stator windings 3 constitute an armature of the motor. A little clearance is defined between respective tips of the teeth 4 and circumferential surfaces of the permanent magnets 6.

In the above mentioned permanent-magnet machine, the permanent magnet of Nd/Fe/B alloy has ten times as much energy product as a ferrite magnet thereby allowing both miniaturization and high power of a magnetic applied instruments. However, the permanent magnet of Nd/Fe/B alloy has a poor temperature characteristic at high temperature so that coercive force is extremely decreased at more than 100° C. (see curves C and D in FIG. 4).

On the other hand, the permanent magnet of Sm/Co alloy exhibits a superior temperature characteristic at less than 300° C. However, under surroundings at high temperature more than 300° C., such as an application for nuclear power, the coercive force is also decreased as similarly to the above mentioned permanent magnet of Nd/Fe/B alloy.

Furthermore, at even approx. 100° C., in case of executing a flux-weakening control, there is a possibility that the permanent magnet is demagnetized since it is subjected to a reduced magnetic field by an armature reaction. For example, as shown in FIG. 4 in which a magnetic characteristic of the permanent magnet of Nd/Fe/B alloy is shown, when the magnetic field caused by the armature reaction affects, a working point of the magnet in the motor moves from a point Po to another point Qo in the curved line C. Consequently, generating an irreversible demagnetization, magnetic flux of the permanent magnet is decreased.

In addition, there is caused a problem that, in the adhesive agent for bonding the permanent magnets 6 to the rotor core 7, the strength of adhesive bonding is gradually reduced by the thermal deterioration caused by its long-term use. Therefore, there has been adopted a method of fitting a thick metal ring made of non-magnetic material, such as stainless steel (e.g., SUS304: JIS classifications), inconel, etc., on the outer periphery of the permanent magnets 6 thereby to fix it to the rotor core 7 securely. In the method, however, since a magnetic gap length becomes longer due to the non-magnetic metal ring, the magnetic flux density in the above mentioned clearance is decreased, so that a power of the motor is lowered.

SUMMARY OF THE INVENTION

It is therefore an object of the present invention to provide a permanent magnet type rotating machine which can prevent a demagnetization of permanent magnets thereby preventing a reduction of the power, even if the permanent magnets are heated into a high temperature and the armature reaction acts on the permanent magnets.

Another object of the present invention is to provide a permanent magnet type rotating machine in which permanent magnets can be fixed to the rotor core securely without reducing a power of the rotating machine.

The objects of the invention described above can be accomplished by a permanent magnet type rotating machine comprising:

a stator having a stator core provided on an inner periphery there of with armature windings;

a rotor shaft arranged coaxially with the stator to penetrate the stator;

a plurality of permanent magnets arranged on an outer periphery of the rotor shaft, the permanent magnets being shaped to have arc cross sections; and a magnetic ring arranged between the permanent magnets and the stator so as to be coaxial with the stator and the rotor shaft.

With the arrangement mentioned above, magnetic reluctance of magnetic circuit viewed from the permanent magnets is reduced by the magnetic ring which is arranged between the permanent magnets and the stator, thereby increasing a magnetic flux density of the permanent magnets at the operational point under condition that the armature reaction operates. Therefore, it is possible to provide the rotating machine which is capable of preventing the permanent magnets from being demagnetized and which is capable of preventing a power of the rotating machine from falling, even when the permanent magnets is heated to a high temperature and the armature reaction affects them.

In the present invention, preferably, the magnetic ring is fitted on outer peripheries of the permanent magnets.

With the arrangement mentioned above, since the magnetic reluctance viewed from the permanent magnets is reduced by the magnetic ring fitted on the outer peripheries of the permanent magnets, thereby increasing the magnetic flux density of the permanent magnets at the operational point under condition that the armature reaction operates, it is possible to provide the rotating machine which is capable of preventing the permanent magnets from being demagnetized and which is capable of preventing a power of the rotating machine from falling, even when the permanent magnets is heated to a high temperature and the armature reaction affects them.

In the present invention, preferably, the magnetic ring comprises stacked silicon steel plates.

With the arrangement mentioned above, since the magnetic reluctance viewed from the permanent magnets is reduced by the magnetic ring of the stacked silicon steel plates thereby to increase the magnetic flux density of the permanent magnets at the operational point at the armature reaction, it is possible to provide the rotating machine which is capable of preventing the permanent magnets from being demagnetized and preventing a power of the rotating machine from falling, even when the permanent magnets is heated to a high temperature and the armature reaction affects them.

In the present invention, preferably, the magnetic ring is formed by a dust core made of magnetic powder.

With the arrangement mentioned above, since the magnetic reluctance viewed from the permanent magnets is reduced by the magnetic ring of the dust core made of magnetic powder thereby to increase the magnetic flux density of the permanent magnets at the operational point at the armature reaction, it is possible to provide the rotating machine which is capable of preventing the permanent magnets from being demagnetized and preventing a power of the rotating machine from falling, even when the permanent magnets is heated to a high temperature and the armature reaction affects them.

In the present invention, preferably, the magnetic ring is formed by magnetic material of ferrite.

With the arrangement mentioned above, since the magnetic reluctance viewed from the permanent magnets is reduced by the magnetic ring formed by the magnetic material of ferrite thereby to increase the magnetic flux density of the permanent magnets at the operational point at the armature reaction, it is possible to provide the rotating machine which is capable of preventing the permanent magnets from being demagnetized and preventing a power of the rotating machine from falling, even when the permanent magnets is heated to a high temperature and the armature reaction affects them.

In the present invention, preferably, the magnetic ring is formed by an amorphous magnetic material.

With the arrangement mentioned above, since the magnetic reluctance viewed from the permanent magnets is reduced by the magnetic ring formed by the amorphous magnetic material thereby to increase the magnetic flux density of the permanent magnets at the operational point at the armature reaction, it is possible to provide the rotating machine which is capable of preventing the permanent magnets from being demagnetized and preventing an output of the rotating machine from falling, even when the permanent magnets is heated to a high temperature and the armature reaction affects them.

In the present invention, preferably, the magnetic ring is made of magnetic material having more than 100 in relative permeability in case of 0.5 T to 0.8 T in magnetic flux density and less than 10 in relative permeability in case of more than 1.6 T in magnetic flux density.

With the arrangement mentioned above, since the magnetic reluctance viewed from the permanent magnets is reduced by the magnetic ring made of the magnetic material having more than 100 in relative permeability in case of 0.5 T to 0.8 T in magnetic flux density and less than 10 in relative permeability in case of more than 1.6 T in magnetic flux density thereby to increase the magnetic flux density of the permanent magnets at the operational point at the armature reaction, it is possible to provide the rotating machine which is capable of preventing the permanent magnets from being demagnetized and preventing a power of the rotating machine from falling, even when the permanent magnets is heated to a high temperature and the armature reaction affects them.

In the present invention, preferably, the permanent magnet type rotating machine further comprises interpole magnets which are inserted between the permanent magnets and each of which is magnetized in a direction perpendicular to a magnetizing direction of the permanent magnets.

With the arrangement mentioned above, since the magnetic reluctance viewed from the permanent magnets is reduced by the magnetic ring and furthermore, a leakage of magnetic flux between the neighboring permanent magnets interposing the magnetic ring therebetween is restricted by the interpole magnets. Therefore, the magnetic flux linkage increases and the magnetic flux density of the permanent magnets at the operational point at the armature reaction, it is possible to provide the rotating machine which is capable of preventing the permanent magnets from being demagnetized and preventing a power of the rotating machine from falling, even when the permanent magnets is heated to a high temperature and the armature reaction affects them.

In the present invention, preferably, a ratio of a length of the outer peripheries of the permanent magnets to a thickness of the magnetic ring is from 8 to 40.

With the arrangement mentioned above, since the magnetic reluctance viewed from the permanent magnets is reduced by the magnetic ring and furthermore, both permeance coefficient of the magnetic circuit viewed from the permanent magnets can be prevented from decreasing thereby to increase the magnetic flux density of the permanent magnets at the operational point at the armature reaction, it is possible to provide the rotating machine which is capable of preventing the permanent magnets from being demagnetized and preventing a power of the rotating machine from falling, even when the permanent magnets is heated to a high temperature and the armature reaction affects them.

In the present invention, preferably, the magnetic ring is fitted on the outer peripheries of the permanent magnets and made from the silicon steel plates and a relationship between a thickness of the magnetic ring in the radial direction and a peripheral length of each permanent magnet is as follows;

$$8 < \tau/Lr < 40$$

where $\tau$: peripheral length of each permanent magnet;
Lr: thickness of magnetic ring.

With the arrangement mentioned above, since the magnetic ring is arranged on the outer periphery of the rotor, the magnetic gap length becomes to be equal to the mechanical gap length, so that the armature reaction field owing to the armature is strengthened. In addition, owing to the armature reaction field, a part of magnetic flux that the permanent magnets produce repulses and then it forms both a neighboring polar and a magnetic circuit through the intermediary of the magnetic ring as a magnetic path, positively. Consequently, it is possible to reduce an amount of field magnetic flux interlinking the armature windings effectively.

In the present invention, preferably, a thickness of the magnetic ring is established in such a manner that an amount of interlinkage flux at nearly zero in current, which may be caused under either a failure condition where a flux-weakening control cannot be operated or a no-load or light-load condition, is smaller than an amount of interlinkage flux under a load condition in case of flowing current.

With the arrangement, when a failure by which the flux-weakening control cannot be executed occurs (d-axis current: 0), a large amount of magnetic flux that the magnetic ring of a considerable thickness generates under a no-load or light-load condition, will leak out into the neighboring magnet through a circumferential magnetic path of the magnetic ring. Therefore, under such conditions, the magnetic flux interlinking the armature windings is decreased. Thus, when it becomes to be impossible of attaining the weakening-field control at a high-speed region, it allows the induced voltage of the rotating machine to be diminished relatively. Consequently, it is possible to prevent a power element of an inverter drive circuit from being broken by an excessive induced voltage. Additionally, since the magnetic flux for the armature will be decreased under even the light-load condition that the armature current is small, the electromagnetic loss can be reduced.

Preferably, the magnetic ring is fitted on outer peripheries of the permanent magnets and made of magnetic material of which saturation magnetic flux density is smaller than that of the silicon steel plate and wherein a relationship between a thickness of the magnetic ring in the radial direction and a peripheral length of each of the permanent magnets is as follows;

$$8 < \tau/Lr < 30$$

where $\tau$: peripheral length of each permanent magnet;
Lr: thickness of magnetic ring.

In this case, since the magnetic ring has a low saturation magnetic flux density in comparison with that of the silicon steel plate, it is necessary to increase a thickness of the magnetic ring in comparison with that of magnetic ring made of the silicon steel plate in order to form such a magnetic circuit that the field magnetic flux extends to the neighboring polar through the magnetic ring. Consequently, comparing with the magnetic ring of the silicon steel plate, it can also provide a firm mechanism for holding the permanent magnets thereby to further increase its limit rotating speed.

In the present invention, preferably the magnetic ring is made of magnetic material having more than 100 in relative permeability in case of 0.5 T to 0.8 T in magnetic flux density and less than 100 in relative permeability in case of more than 1.6 T in magnetic flux density and a relationship between a thickness Lr of the magnetic ring in the radial direction and a peripheral length $\tau$ of each of the permanent magnets is as follows:

$$8 < \tau/Lr < 30$$

Alternatively, the magnetic ring is made of dust core consisting of magnetic metal powder and resin compounds serving both insulation of the material and joining of the magnetic metal powder. Also in this case, the relationship between the thickness Lr of magnetic ring in the radial direction and the peripheral length $\tau$ of the single permanent magnet is as follows:

$$8 < \tau/Lr < 30$$

Again, the magnetic ring may be made of magnetic material of ferrite on condition that the relationship between the thickness Lr of the magnetic ring in the radial direction and the peripheral length $\tau$ of the single permanent magnet is as follows:

$$8 < \tau/Lr < 30$$

Furthermore, the magnetic ring may be made of magnetic material of amorphous on condition that the relationship between the thickness Lr of the magnetic ring in the radial direction and the peripheral length $\tau$ of the single permanent magnet is as follows:

$$8 < \tau/Lr < 30$$

With the above establishment of $\tau/Lr$, by adjusting an intensity of the armature reaction caused by the d-axis current, it is possible to control the amount of field magnetic flux interlinking the armature windings, i.e., the terminal voltage of the rotating machine effectively.

Preferably, in the above mentioned modes, a thickness of the magnetic ring is established in such a manner that an amount of interlinkage flux at nearly zero in current is smaller than an amount of interlinkage flux under a load condition in case of flowing the current.

According to another form of the present invention, there is also provided a permanent magnet type rotating machine comprising:
a stator having a stator core provided on an inner periphery thereof with armature windings;
a rotor shaft arranged coaxially with the stator to penetrate the stator;
a plurality of permanent magnets arranged on an outer periphery of the rotor shaft, the permanent magnets being shaped to have arc cross sections; and
a magnetic ring arranged between the permanent magnets and the stator so as to be coaxial with the stator and the rotor shaft;
wherein the magnetic ring is fitted on an inner surface of the stator core, opposing the rotor.

With the arrangement mentioned above, the magnetic ring is magnetically connected in a short-circuit with the stator core and a gap is defined between the magnetic ring and the permanent magnets of the rotor. Therefore, although the magnetic flux leaking in the circumferential direction of the field magnetic flux is decreased in comparison with the afore-mentioned cases that the rotor is provided with the magnetic ring, an effect similar to the afore-mentioned cases can be attained.

In the above mentioned invention, preferably, the magnetic ring is made of any one of silicon steel plates, magnetic material of which saturation magnetic flux density is smaller than that of a silicon steel plate, magnetic material of which relative permeability is more than 100 on condition that magnetic flux density thereof is from 0.5 T to 0.8 T and of which relative permeability is less than 100 on condition that magnetic flux density thereof is more than 1.6 T, dust core consisting of magnetic metal powder and resin compounds serving both insulation of the material and joining of the magnetic metal powder, ferrite and amorphous magnetic material. In this case, the magnetic ring may consist of a plurality of elongated pieces which are laid to overlap each other in a circumferential direction of the rotor and each of which extends in an axial direction of the rotor. Alternatively, the magnetic ring may consist of a plurality of ring-shaped thin plates laid to overlap each other in an axial direction of the rotor.

According to one of forms of the present invention, there is also provided a permanent magnet type rotating machine comprising:
a stator having a stator core provided on an inner periphery thereof with teeth which interpose slots therebetween;
armature windings accommodated in the slots, respectively;
magnetic tips each of which is arranged on an openings of each of the slots;
a rotor shaft arranged coaxially with the stator to penetrate the stator; and a plurality of permanent magnets arranged on an outer periphery of the rotor shaft, the permanent magnets being shaped to have arc cross sections;

wherein the armature windings and the magnetic tips constitute an armature.

In the present invention, preferably, the magnetic wedges are made of any one of silicon steel plates, magnetic material of which saturation magnetic flux density is smaller than that of a silicon steel plate, magnetic material of which saturation magnetic flux density is smaller than that of said rotor core, magnetic material of which relative permeability is more than 100 on condition that magnetic flux density thereof is from 0.5 T to 0.8 T and of which relative permeability is less than 100 on condition that magnetic flux density thereof is more than 1.6 T, dust core consisting of magnetic metal powder and resin compounds serving both insulation of the material and joining of the magnetic metal powder, ferrite and amorphous magnetic material. In this case, each of the magnetic wedges may consist of a plurality of elongated pieces which are laid to overlap each other in a circumferential direction of the stator and each of which extends in an axial direction of the stator. Alternatively, each of the magnetic wedges may consist of a plurality of rectangular-shaped thin plates laid to overlap each other in an axial direction of the stator.

According to one of forms of the present invention, there is also provided a permanent magnet type rotating machine comprising:

a stator having a stator core provided on an inner periphery thereof with armature windings;

a rotor shaft arranged coaxially with the stator to penetrate the stator;

a plurality of permanent magnets arranged on an outer periphery of the rotor shaft, the permanent magnets being shaped to have arc cross sections; and magnetic discs mounted on side faces of either one of the stator and the rotor.

According to the present invention, there is also provided a permanent magnet type rotating machine comprising:

a stator having a stator core provided on an inner periphery thereof with armature windings, the stator core being made of magnetic material;

a rotor core arranged coaxially with the stator to penetrate the stator, the rotor core being made of magnetic material;

a plurality of permanent magnets arranged on an outer periphery of the rotor core at intervals in the circumferential direction, a plurality of magnetic members each of which is arranged on an outer surface of each of the permanent magnets; and end rings mounted on the rotor core at both axial ends thereof so as to be apart from axial ends of the magnetic members through suitable gaps, the end rings being made of magnetic material and magnetically joined to the rotor core.

With the arrangement mentioned above, since the magnetic members are arranged on the surfaces of the permanent magnets of the rotor, the magnetic gap length becomes to be equal to the mechanical gap length, so that the armature reaction field owing to the armature is strengthened. Thus, an effect of flux-weakening by the armature reaction is developed. Further, when executing the flux-weakening control in a high-speed region, there is formed a new magnetic circuit constituted by a flow of "rotor core—permanent magnet—magnetic members—end ring—rotor core" in addition to the conventional magnetic circuit of a flow of "rotor core—permanent magnet—stator core—permanent magnet—rotor core". Therefore, the magnetic flux interlinking the armature windings is decreased, so that the flux-weakening operates effectively. Consequently, by executing the flux-weakening control in the high-speed region, the terminal voltage of the rotating machine is reduced thereby to permit it to drive with high power factor and high efficiency.

In the above mentioned rotating machine, the magnetic members can be easily made from silicon steel plates.

Also, the magnetic members may be made of Fe/Co/V alloy. In this case, since the high saturation magnetic flux density of Fe/Co/V alloy is 2.3 T, it is possible to enlarge the armature current for flux-weakening in comparison with a case of using the magnetic members made from the silicon steel plate.

Also, the magnetic members may be made of stainless steel.

In the present invention, preferably, the magnetic members are made of dust core consisting of magnetic metal powder and resin compounds serving both insulation of the material and joining of the magnetic metal powder. Alternatively, the magnetic members may be made of ferrite.

In the above case, these materials represent slight drops in magnetic flux density (i.e., a fall of permeability) in even a high-frequency region. Therefore, even when the magnetic member is not formed as a laminated element but as an integrated element, it is possible to reduce the eddy current. Accordingly, when the dust core and ferrite material are adopted as material for the magnetic member, the machine performance will be improved in spite of its simple structure.

Also, the magnetic members may be made of amorphous magnetic material.

In the present invention, preferably, each magnetic member is constituted by magnetic thin plates laminated to each other.

In any one of the following cases: case that a further high-efficiency is required for the machine; case that the rotor rotates at high-speed; case of multipolar rotating device; case that an armature slot is opening, with such an arrangement mentioned above, it is possible to reduce the eddy current.

Furthermore, according to the present invention, there is also provided an axial-gap type and permanent magnet type rotating machine comprising:

a disc-shaped stator having a stator core provided on an inner periphery thereof with armature windings thereby providing an armature, the stator core being made of magnetic material;

a rotor arranged to oppose the stator through a suitable gap, the rotor having a rotor core made of magnetic material;

a plurality of permanent magnets arranged in the rotor core at intervals in the circumferential direction, a magnetic members attached on side faces of the permanent magnets, the side faces facing the gap; and end rings provided on inner and outer peripheral surfaces of the rotor core so as to be apart from the magnetic member through a suitable clearance, the end rings being made of magnetic material and magnetically joined to the rotor core.

With the above arrangement, the rotating machine can rotate in a wide range extending from low-speed to high-speed and the rotation with a high power factor and efficiency can be realized.

In the present invention, preferably, the end rings are made of Fe/Co/V alloy. In this case, the material allows the flux-weakening to be enlarged.

Preferably, the end ring is constituted by magnetic thin plates which are laid to overlap on each other. Also in such a case, it is possible to reduce the eddy current.

In order to reinforce a structure of the rotating machine itself, it is preferable that the clearance between the magnetic members and the end ring is occupied with non-magnetic material. Even in this case, it is possible to operate the flux-weakening effectively.

According to the present invention, there is also provided a permanent magnet type rotating machine comprising:

a stator having a stator core provided on an inner periphery thereof with armature windings, the stator core being made of magnetic material;

a rotor core arranged coaxially with the stator to penetrate the stator, the rotor core being made of magnetic material;

a plurality of permanent magnets arranged on an outer periphery of the rotor core at intervals in the circumferential direction, a plurality of magnetic members each of which is arranged on an outer surface of each of the permanent magnets; and end rings mounted on the rotor core at both axial ends thereof so as to be in contact with ends of the magnetic members, the end rings being made of magnetic material and magnetically joined to the rotor core.

With such an arrangement that the end rings are brought into contact with the ends of the magnetic members without a magnetic gap, a variety of elements i.e., the end rings and the permanent magnets, are integrated thereby to increase a strength of the rotating machine.

In the present invention, the end rings may be magnetically joined to the rotor core through the intermediary of non-magnetic material. Even in this case, the arrangement allows the flux-weakening to be operated effectively.

In the present invention, it is preferable that the above mentioned rotating machine further comprises a damper bar which penetrates the magnetic member in an axial direction thereof and which has both axial ends respectively connected to a conductive short-circuit ring attached to the rotor core.

With the above arrangement, when a radical load change occurs, braking operation is exerted on the rotor due to the damper bar, whereby the rotation of machine can be stabilized.

Furthermore, according to the present invention, there is also provided a permanent magnet type rotating machine comprising:

a stator having a stator core provided on an inner periphery thereof with armature windings, the stator core being made of magnetic material;

a rotor core arranged coaxially with the stator to penetrate the stator, the rotor core being made of magnetic material;

a plurality of permanent magnets arranged on an outer periphery of the rotor core, and a magnetic ring arranged on surfaces of the permanent magnets, the magnetic ring being made of magnetic material of which saturation magnetic flux density is lower than that of the rotor core.

With the above arrangement and under condition of viewing the rotor from the armature windings, since the magnetic ring is positioned on the surfaces of the permanent magnets of the rotor, the magnetic gap length becomes to be equal to the mechanical gap length, so that the armature reaction field owing to the armature is strengthened. Thus, an effect of the flux-weakening by the armature reaction is developed. Since the magnetic ring is made of magnetic material of low saturation magnetic flux density, when the flux-weakening control is not executed in the range from low-speed rotation to middle-speed rotation, most of the field magnetic flux will flow to the diametrical direction to cross the gap and then interlink the armature windings for an effective utilization. On the other hand, when executing the flux-weakening control in the high-speed region, the field magnetic flux repulses by the armature reaction field and then forms both a neighboring polar and a magnetic circuit through the intermediary of the magnetic ring as a magnetic path, positively. Consequently, it is possible to reduce an amount of field magnetic flux interlinking the armature windings effectively. That is, by executing the flux-weakening control in the high-speed region, the terminal voltage of the rotating machine is reduced, whereby the operation with high power factor and high efficiency can be realized.

Furthermore, according to the present invention, there is also provided a permanent magnet type rotating machine comprising:

a stator having a stator core provided on an inner periphery thereof with armature windings, the stator core being made of magnetic material;

a rotor core arranged coaxially with the stator to penetrate the stator, the rotor core being made of magnetic material;

a plurality of permanent magnets arranged on an outer periphery of the rotor core, and a magnetic ring arranged on surfaces of the permanent magnets, the magnetic ring being made of magnetic material of which relative permeability is more than 100 on condition that magnetic flux density thereof is from 0.5 T to 0.8 T and of which relative permeability is less than 100 on condition that magnetic flux density thereof is more than 1.6 T.

In the above arrangement, the magnetic ring of low relative permeability may be made of any one of the dust core, the ferrite and the amorphous magnetic material.

Further, in the above mentioned rotating machine, even if the magnetic ring is arranged on the inner periphery of the stator core, the operation with high power factor and high efficiency can be realized. The reason why such operation and effects can be obtained is that, since the magnetic ring is magnetically connected to the stator core in a short-circuit condition and there is a clearance between the magnetic ring and the permanent magnets of the rotor, magnetic flux that leaks to the circumferential direction of the field magnetic flux is reduced in comparison with a case of providing the rotor with the magnetic ring. Thus, the magnetic ring can be made from the silicon steel plate.

Of course, the magnetic ring arranged on the inner periphery of the stator core may be made of any one of the magnetic material of low relative permeability, i.e., more than 100 in relative permeability on condition of 0.5 T to 0.8 T in magnetic flux density and less than 100 on condition of 1.6 T in magnetic flux density, thereof is more than 1.6 T, the dust core, the ferrite and the amorphous magnetic material.

In the present invention, preferably, the magnetic ring provided on either the rotor's side or the stator's side is constituted by a lamination consisting of magnetic thin plates. In this case, it is possible to reduce the eddy current.

BRIEF DESCRIPTION OF THE DRAWINGS

FIGS. 19A, 19B, 19C show distributions of flux lines about the single permanent magnet of FIG. 14, in case of 0°, 60° and 90° in the phase difference, respectively;

DESCRIPTION OF THE PREFERRED EMBODIMENT

Embodiments of the present invention will now be described with reference to the accompanying drawings hereinafter.

Figure 1:
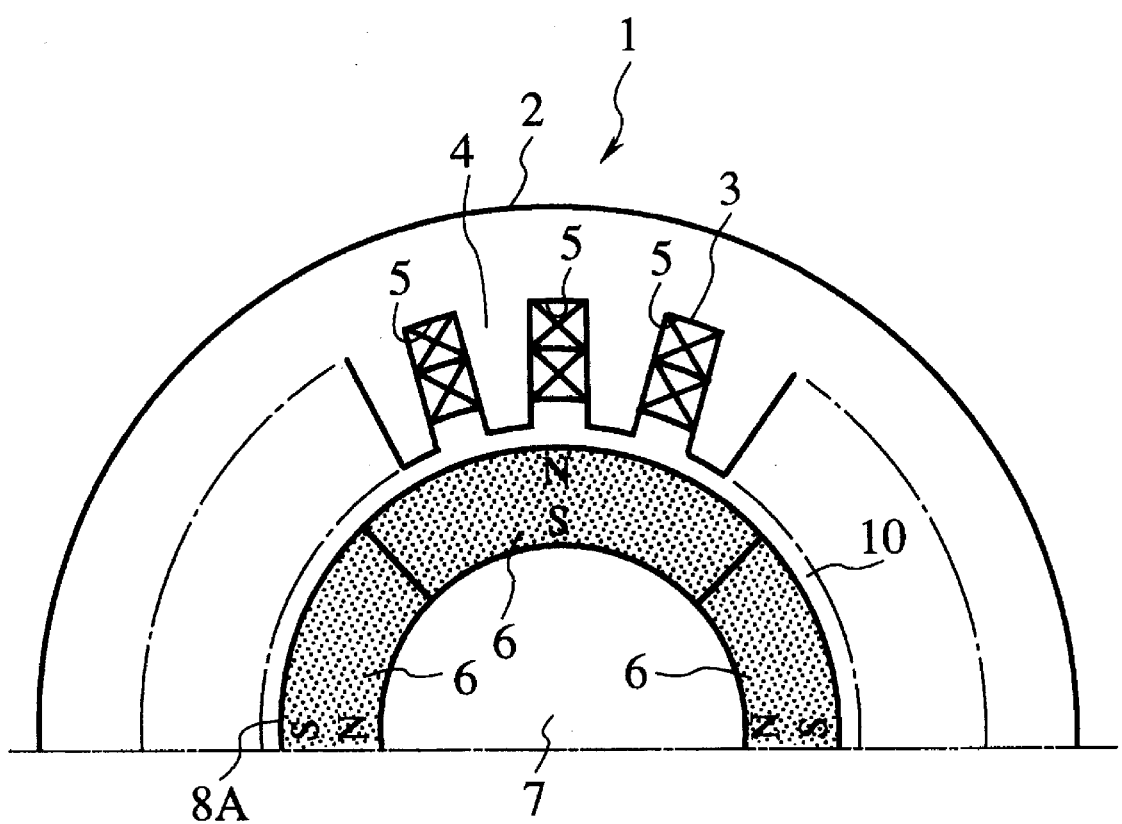
FIG. 1 is a cross sectional view of a half portion of the conventional permanent magnet type rotating machine.
Figure 2:
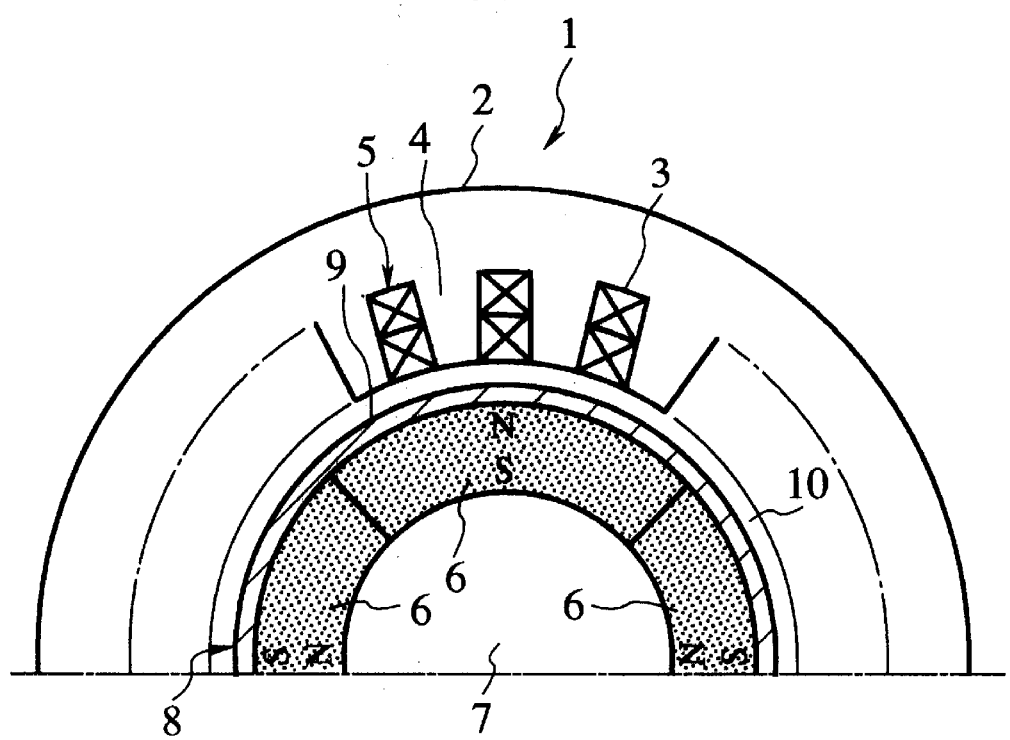
FIG. 2 is a cross sectional view of a half portion of a permanent magnet type rotating machine in accordance with a first embodiment of the present invention.

FIG. 2 is a cross sectional view showing a permanent magnet type rotating machine in accordance with the first embodiment of the present invention. In FIG. 1, reference numeral 1 designates a stator, 2 a stator core and 8 a rotor, respectively. The rotor 8 comprises a rotor core 7 which is arranged coaxially with the stator and four permanent magnets 6 of Nd/Fe/B alloy which are mounted on an outer periphery of the rotor core 7. As shown in the figure, each permanent magnet 6 is shaped so as to have an arc cross-section.

The rotor 8 further includes a cylindrical magnetic ring 9 which is fitted on the outer peripheries of the permanent magnets 6.

In order to provide the above mentioned magnetic ring 9, firstly, stainless steel plates (SUS630) are punched into numerous annular pieces as constituents of the magnetic ring 9. Then, from one axial side of the cylindrical permanent magnets 6, the so-obtained annular pieces are brought on an outside of the cylindrical permanent magnets 6 to overlap each other until a thickness of the resultant lamination is equal to the axial length of the permanent magnets 6. In this way, the magnetic ring 9 can be obtained. Next, the assembled magnetic ring 9 and the permanent magnets 6 are engaged on the rotor core 7 under condition that they are pressed from both axial sides thereof and further immersed in a vacuum dipping bath filled with epoxy resin. Consequently, the magnetic ring 9, the permanent magnets 6 and the rotor core 7 are joined to each other through the intermediary of the epoxy resin, whereby the integrated rotor 8 can be accomplished.

Figure 7:
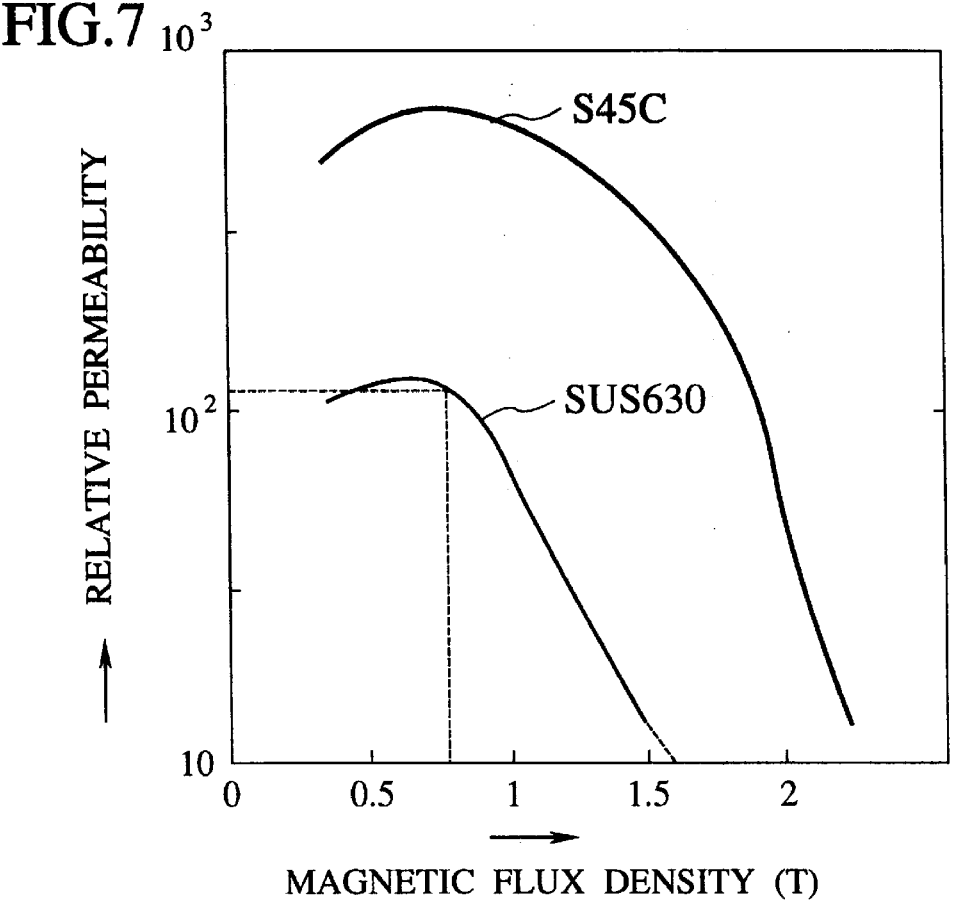
FIG. 7 is a diagram showing respective magnetic characteristics of materials S45C (carbon steel of 0.45 w % C) and SUS630 (magnetic stainless steel) which are used for a rotor core and a magnetic ring installed in the permanent magnet type rotating machine of the present invention.

Also in the embodiment, the rotor core 7 is made of the above mentioned carbon steel for machine structures (S45C), of which magnetic characteristic is shown in FIG. 7.

Hereat, providing that a thickness of the magnetic ring 9 in the radial direction is represented by Lr and a peripheral length of the permanent magnet 6 in the arc direction is represented by $\tau$, a relationship between Lr and $\tau$ of the embodiment is established as follows:

$$8 < \tau/Lr < 40$$

Note, the above stainless steel plate (SUS630) constituting the magnetic ring 9 exhibits such a magnetic characteristic as shown in FIG. 7 where a relationship between the relative permeability and the magnetic flux density is illustrated. That is, in case of 0.5 T to 0.8 T in magnetic flux density, the relative permeability becomes to be more than 100. Similarly, in case of more than 1.6 T in magnetic flux density, the relative permeability becomes to be less than 10.

In the so-constructed permanent magnet rotating machine, magnetic circuits viewed from the permanent magnets' side consist of two circuits as follows: one is a magnetic circuit interposing a gap, which is constituted by a cycle of "the permanent magnet 6→the magnetic ring 9→the gap 10→the stator core 2→the gap 10→the magnetic ring 9→the permanent magnet 6", as similar to a general rotating machine; the other is a circuit with no gap, which is constituted by a cycle of "the original permanent magnet 6→the magnetic ring 9→the neighboring permanent magnet 6→the rotor core 7→the original permanent magnet 6". Therefore, on a load side of the permanent magnets 6, since the latter magnetic circuit with no gap is connected in parallel with the former conventional magnetic circuit with the gap 10, a magnetic reluctance viewed from the permanent magnets 6 can be reduced in comparison with a conventional permanent magnet type rotating machine.

Figure 4:
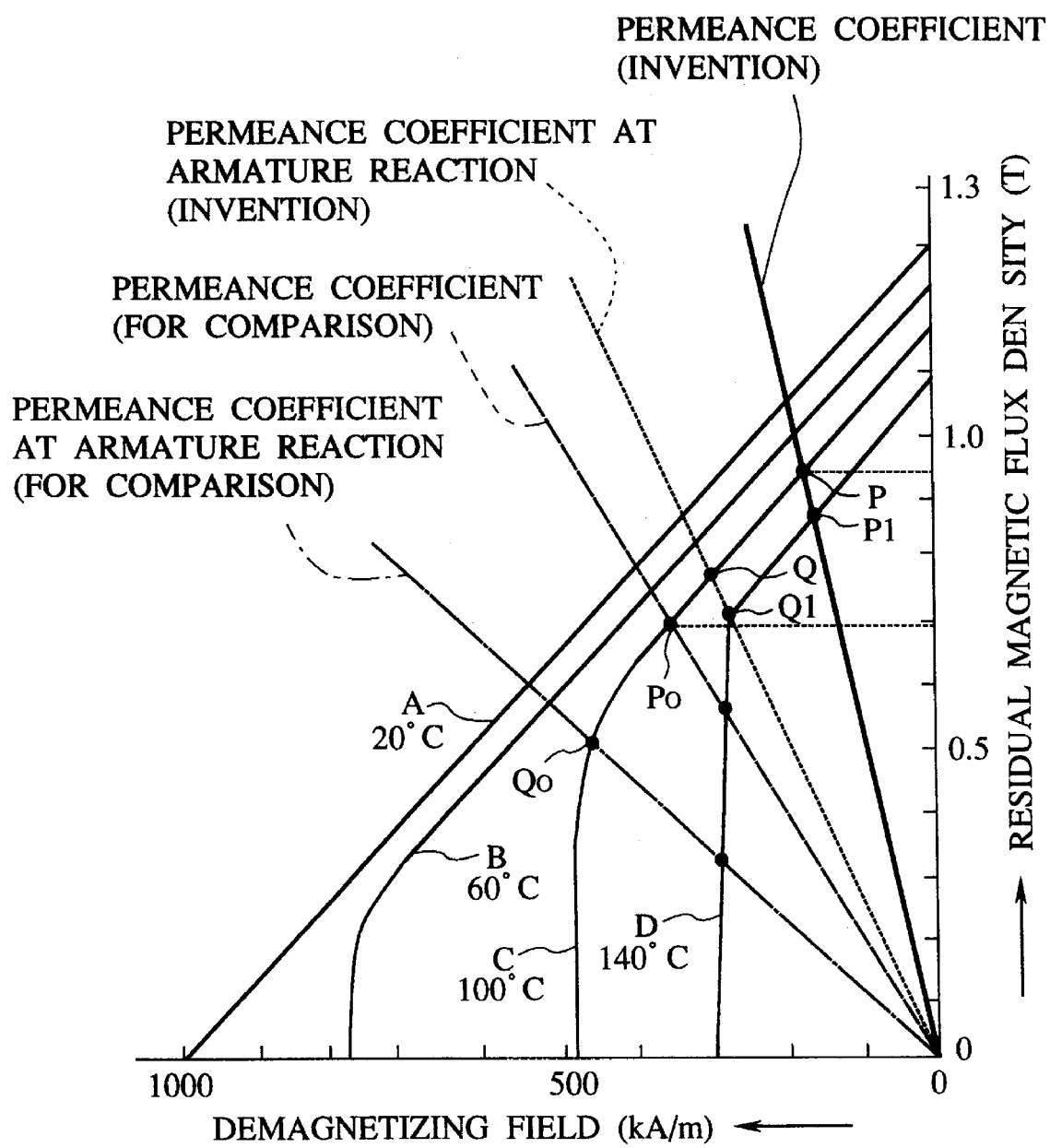
FIG. 4 is a diagram showing changes of the permeance coefficient caused by the armature reaction in case of adopting neodymium, ferrite and boron as materials for a permanent magnet.

In FIG. 4, lines A, B, C and D designate respective demagnetizing characteristics of the permanent magnets 6 due to a difference in magnetic reluctance viewed from the permanent magnets 6, and the magnetic flux density at every temperatures, showing changes in permeance coefficient due to the armature reaction. It will be understood that, in the permanent magnet type rotating machine of the present invention, an operating point of the permanent magnet 6 without the armature reaction will be a point of "P" in the line C showing changes of the permanent magnets 6 at 100° C., showing a remarkable improvement in comparison with a point of Po which is an operation point of a rotating machine for comparison example.

In detail, the comparison rotating machine has 0.69 T in magnetic flux density at Po of operating point. On the contrary, the rotating machine of the present invention has 0.95 T in magnetic flux density at P of operating point, which is 1.38 times as much as the comparison rotating machine having no magnetic ring inserted.

Also on the line of D showing the permanent magnets 6 of 140° C., it will be understood that the operating point P1 of the invention exhibits a slight down in comparison with the above characteristics at 100° C. and that the point Q1 under the armature reaction exceeds the operating point Po in the comparison rotating machine at 100° C.

Figure 3:
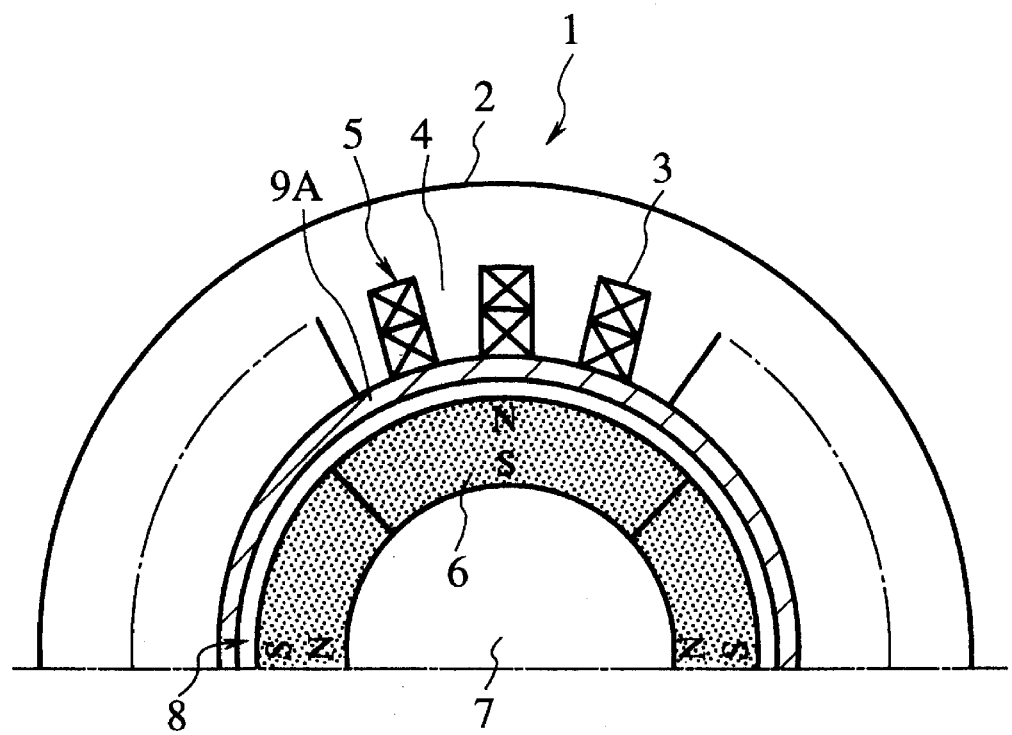
FIG. 3 is a cross sectional view of a half portion of a permanent magnet type rotating machine in accordance with a second embodiment of the present invention.

FIG. 3 is a cross sectional view showing the second embodiment of the present invention. Regarding the embodiments which will be described hereinafter, the elements similar to those in the first embodiment are indicated with the same reference numerals in the figures, respectively.

According to the second embodiment, the stator core 2 is provided on an inner peripheral surface of the teeth 4 with a magnetic ring 9A of which a radial thickness is larger than that of the above mentioned magnetic ring 9, thereby decreasing the magnetic reluctance between the permanent magnets 6 and the stator core 2, the magnetic flux of the permanent magnets increase.

Figure 5:
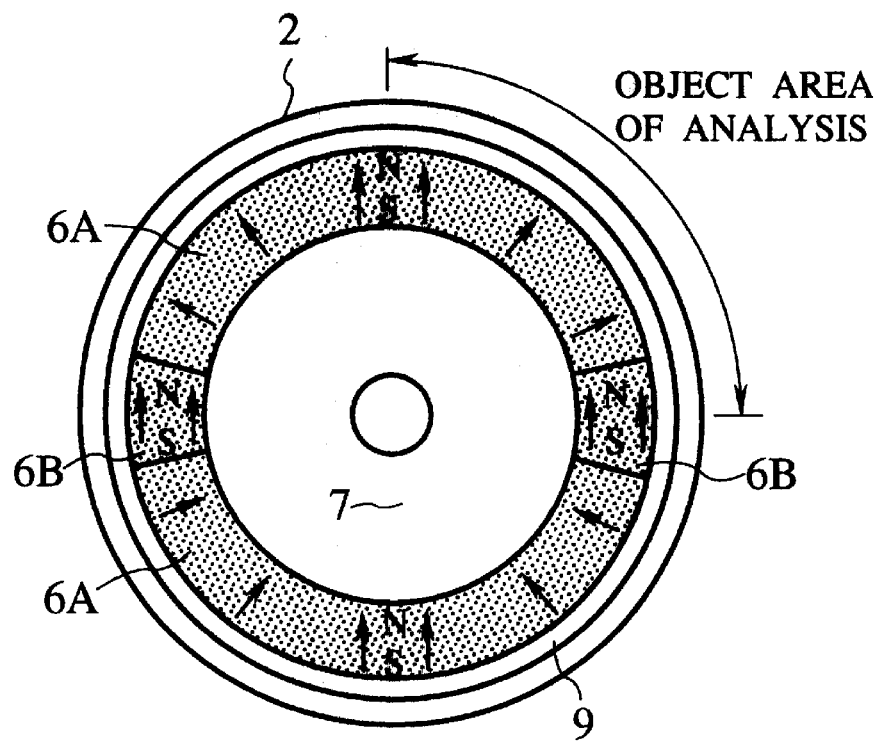
FIG. 5 is a cross sectional view of a part of a permanent magnet type rotating machine in accordance with a third embodiment of the present invention.

FIG. 5 shows a cross section of a bipolar type rotor of a rotating machine in accordance with the third embodiment of the present invention. As shown in the figure, on the outer periphery of the rotor core 7, two opposing interpole magnets 6B, each of which is shaped in a short arc, are respectively interposed between the permanent magnets 6A, providing a cylinder of permanent magnets. Each of the interpole magnets 6B is magnetized in a direction perpendicular to a magnetizing direction of the permanent magnet 6A, in other words, a direction tangential to the arc. Regarding its magnetization polarity, each interpole magnet 6B is respectively arranged in such a manner that a polarity of a side thereof contacting with the permanent magnet 6A is the same as a polarity thereof on the gap 10 side.

Figure 6:
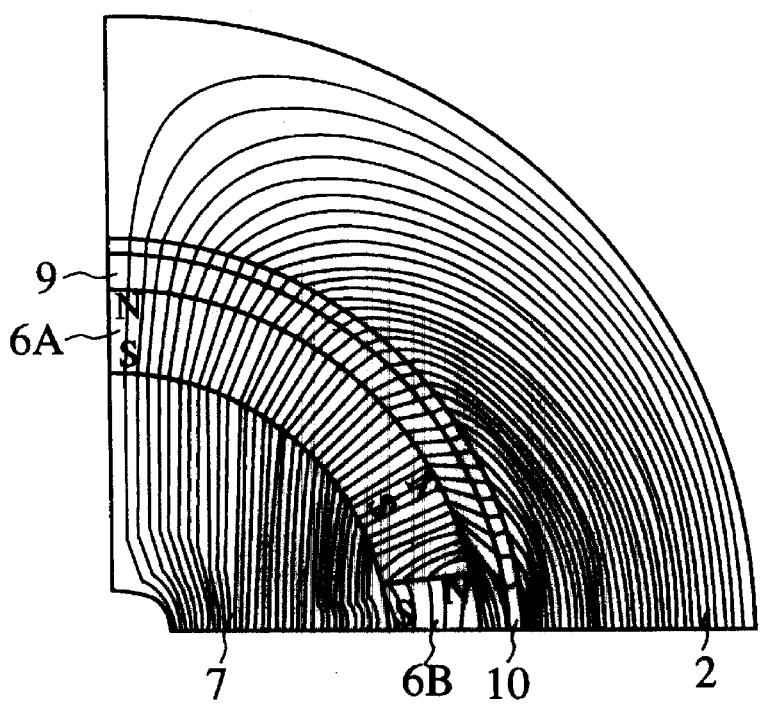
FIG. 6 is an operational view of the permanent magnet type rotating machine of FIG. 5, in which the magnetic flux is illustrated.

FIG. 6 shows a partial magnetic flux distribution brought by magnetomotive force of the permanent magnet 6A of the permanent magnet type rotating machine equipped with the rotor of FIG. 5. Note that, in this figure, the shown distribution is obtained on the presumption that the respective slots 5 between the teeth 4 of FIGS. 2 and 3 are omitted.

As shown in FIGS. 5 and 6, the magnetic flux leaking out to the circumferential direction at a pole end of the magnetic ring 9 is piled with the magnetic flux travelling from the permanent magnet 6 to the neighboring permanent magnet through the magnetic ring 9, so that the magnetic flux density is increased to be more than 1.6 T at the pole end of the magnetic ring 9.

Hereat, since the relative permeability of the magnetic ring 9 exhibits about 10 at magnetic flux density of 1.6 T as shown FIG. 7, the magnetic reluctance at the interpole sections will be raised. Therefore, a leakage of the magnetic flux in the circumferential direction becomes to be a little, whereby a part of the magnetic flux gets into the stator core 2 via the gap 10 as shown in FIG. 6.

On the other hand, due to insertion of the interpole permanent magnet 6B,.a direction of the magnetic flux therefrom becomes to be opposite to a direction of the magnetic flux generated from the permanent magnet 6A to passe through the magnetic ring 9. Therefore, since the magnetic flux at an end of the permanent magnet 6A is restricted to pass in the leakage direction by the magnetic flux from the interpole permanent magnet 6B, it is possible to increase an effective amount of magnetic flux that can reach the stator core 2 through the gap 10.

According to the inventor's analysis, it has been found that the magnetic flux density of the permanent magnet 6 passing through the gap 10 is 0.92 T in the present rotating machine while that of the conventional rotating machine shown in FIG. 1 counts 0.71 T. That is, it means that the magnetic flux density of the gap of the present permanent type rotating machine is approx. 1.3 times as much as that of the conventional machine.

Conventionally, in the rotating machine employing the permanent magnet to produce a field system, the magnet circuit has been designed so that the magnetic flux density by the permanent magnet counts 0.8 T to 1 T at the gap. On the contrary, by interposing the magnetic ring of stainless steel (SUS630), which has the relative permeability of 120 in case of 0.8 T in magnetic flux density as shown in FIG. 7, between the permanent magnet and the stator core, it is possible to minimize a reduction of the magnetic flux density at the gap, as shown in FIG. 6.

Figure 8:
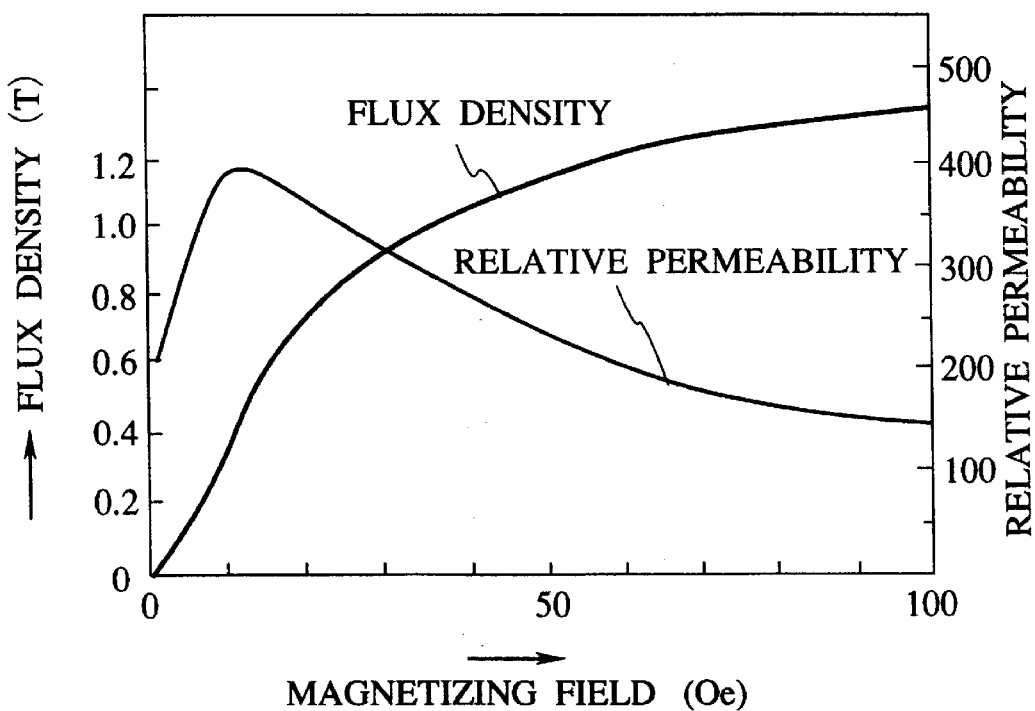
FIG. 8 is a diagram showing magnetizing characteristic of dust core which can be used for the magnetic ring installed in the permanent magnet type rotating machine of the present invention.

FIG. 8 is a diagram showing relationships between magnetizing field, magnetic flux density and relative permeability in case that, instead of the stainless steel (SUS630), magnetic dust material which is easy for molding in an arc is employed as materials for the magnetic ring.

As shown in FIG. 8, in the early stage of increasing from zero in the magnetizing field, the material exhibits a maximum of the relative permeability and then the increasing ratio of magnetic flux density exhibits a maximum. As the magnetizing field further increases, the relative permeability is reduced and accordingly, the increasing ratio of magnetic flux density is gradually decreased.

Figure 9:
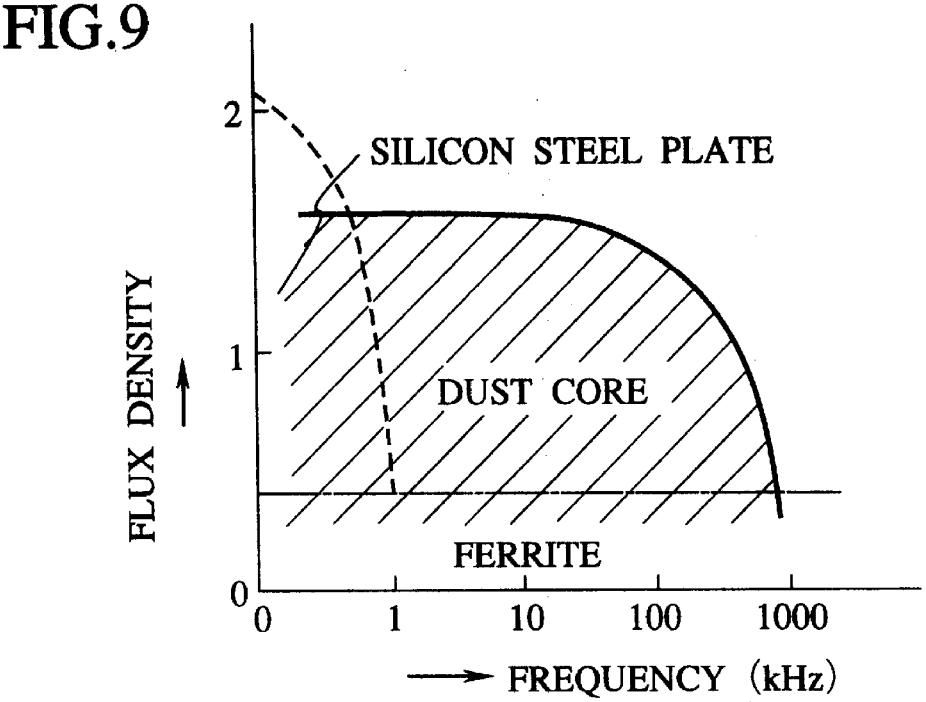
FIG. 9 is a diagram showing respective magnetic characteristic of silicon steel plates and ferrite which are used for the magnetic ring installed in the permanent magnet type rotating machine of the present invention.

FIG. 9 is a diagram showing respective magnetic characteristic of the dust core, ferrite adopted as the metal ring and the silicon steel plate adopted as the permanent magnets 6, 6A. As will be apparent from FIG. 9, when the electricity for exciting the stator windings has a high frequency, either the dust core or ferrite may be used as materials for the permanent magnet and the magnetic ring thereby preventing the magnetic flux density from falling.

Figure 10:
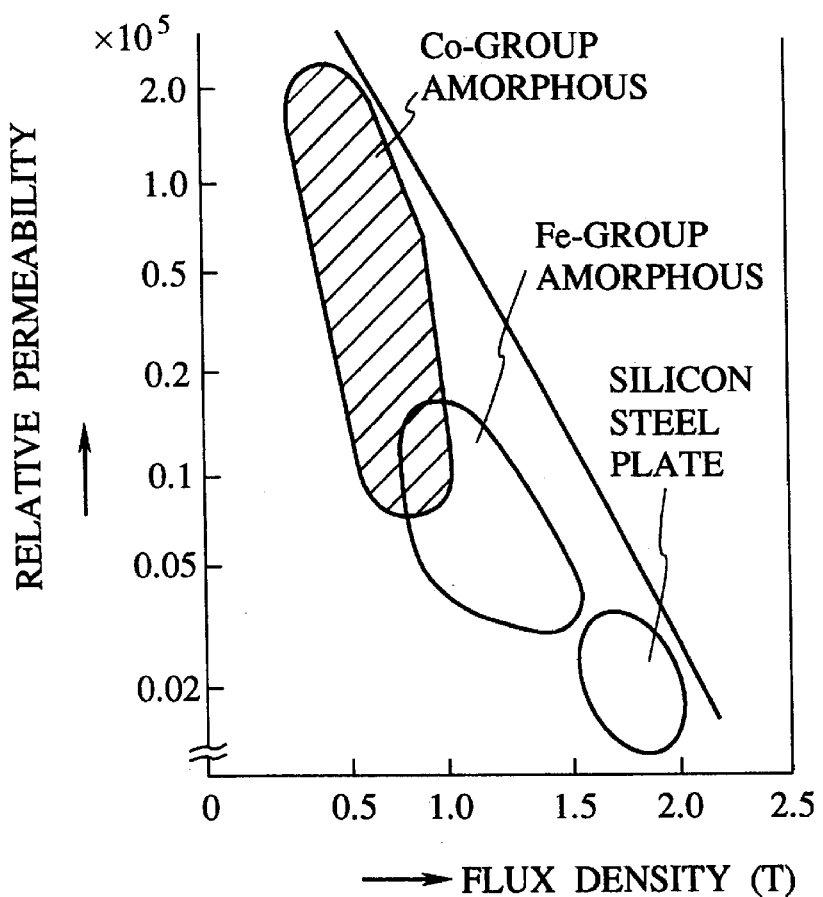
FIG. 10 is a diagram showing respective magnetic characteristic of amorphous materials and silicon steel plates which are used for the magnetic ring installed in the permanent magnet type rotating machine of the present invention.

FIG. 10 is a diagram showing a relationship between the magnetic flux density and the relative permeability in case of adopting the amorphous magnetic materials as the permanent magnet and the magnetic ring, comparing with those made of the silicon steel plate.

As shown in FIG. 10, central ferric-group amorphous material has a superior relative permeability to that of the silicon steel plate and furthermore, the cobalt-group amorphous material has a relative permeability of twice as much as that of the ferric-group amorphous material. Therefore, by adopting the above mentioned dust core and the amorphous magnetic materials as the permanent magnet and the magnetic ring, it is possible to miniaturize the permanent magnet type rotating machine of the invention.

Figure 11:
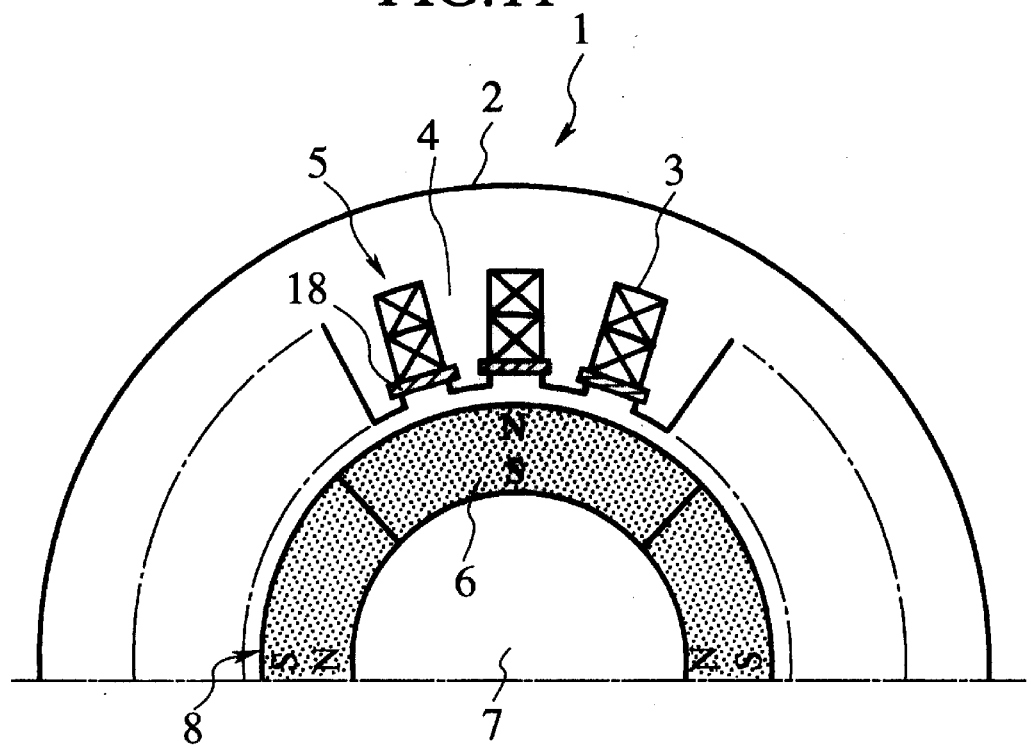
FIG. 11 is a cross sectional view of a half portion of a permanent magnet type rotating machine in accordance with a fourth embodiment of the present invention.

FIG. 11 is a partial cross sectional view showing the permanent magnet type rotating machine in accordance with the fourth embodiment of the present invention. According to the embodiment, the stator core 2 is provided at respective openings of the slots 5 with magnetic wedges 18 each of which is shaped to be a strip. The magnetic wedges 18 may be made of various materials, such as silicon steel plate, magnetic material of 0.5~0.8 T in magnetic flux density on condition of more than 100 in relative permeability and more than 1.6 T in magnetic flux density on condition of more than 10 in relative permeability, the dust core consisting of magnetic metal powder and resin compound for insulating and joining the powder, ferrite material, amorphous magnetic material and so on.

With the arrangement mentioned above, as similar to the afore mentioned rotating machine of FIG. 3, it is possible to reduce the magnetic reluctance of the gap defined between the stator core 2 and the permanent magnets 6, whereby the rotating machine which is capable of preventing both a demagnetization of the permanent magnets caused by the armature reaction and a fall in the output in even an environment of high temperature, can be provided.

Regarding the arrangement, the wedges 18 may be stacked in the axial direction of the stator 1. Consequently, it is possible to reduce an eddy current produced by a high-frequency magnetic field generated by the slots 5 and the teeth 4 and the other high-frequency magnetic field generated by an inverter.

Figure 12:
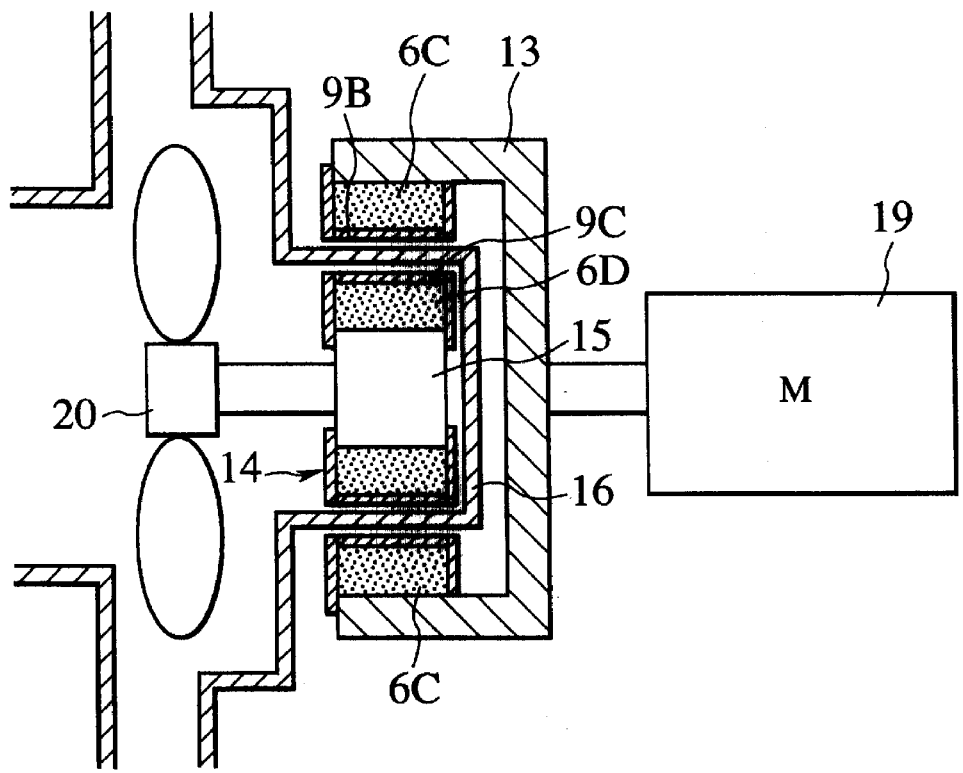
FIG. 12 is a longitudinal cross sectional view of a permanent magnet type rotating machine in accordance with a fifth embodiment of the present invention.

FIG. 12 shows the permanent magnet type rotating machine in accordance with the fifth embodiment of the present invention, in which permanent magnets 6c and 6D used for magnetic coupling are provided on inner and outer peripheries thereof with magnetic rings 9B and 9C, respectively.

That is, in the embodiment shown in FIG. 12, a plurality of permanent magnets 6C are arranged on the inner periphery of a substantially C-shaped outer rotational yoke 13 fixed to a shaft of a motor 18. The permanent magnets 6C are urged by the cylindrical magnetic ring 9B and fixed to the outer rotational yoke 13.

On the other hand, an inner rotational yoke 15 is fixed on a shaft of a fan 20 to have a plurality of permanent magnets 6D arranged thereabout. The cylindrical magnetic ring 9C is attached to the outer peripheries of the permanent magnets 9D. A partition wall 16 is arranged between the magnetic rings 9B and 9C.

Also in the so-constructed magnetic coupling, by arranging the magnetic rings 9B and 9C so as to oppose the permanent magnets 6C and 6D, respectively, it is possible to increase the torque of the fan 20 since the magnetic flux which reaches the permanent magnets 6C and 6D increases, as previously mentioned with reference to FIG. 6.

Note, regarding the relationship between the aforementioned peripheral length $\tau$ of the permanent magnet and the width (thickness) Lr of the magnetic ring, when the value of $\tau/Lr$ is small, the magnetic flux density of the gap in the rotating machine is decreased while the permanent magnet grows is intensified against the demagnetized field because of its increased permeance coefficient. Therefore, it is preferable that the value of $\tau/Lr$ is in a range from 10 to 40 in case of the magnetic ring of the silicon steel plates. On the other hand, it is also preferable that, when the magnetic ring is made of any one of the magnetic powder, the ferrite, the amorphous material, the magnetic material of 0.5~0.8 T in magnetic flux density on condition of more than 100 in relative permeability and more than 1.6 T in magnetic flux density on condition of less than 10 in relative permeability, the value $\tau/L$ is included in a range from 8 to 30.

Incidentally, in the permanent magnet type rotating machine, the field magnetic flux is fixed to be constant since the permanent magnet is used to generate a field system. Accordingly, an amount of magnetic flux that interlinks the armature windings becomes to be constant, whereby an induced voltage of the machine varies in proportion to the rotating speed of rotor and correspondingly, the terminal voltage of the device also changes.

By the way, regarding a motor which is used for an electrical propulsion system installed in an electrical automobile, a compressor or the likes, the motor is driven under a constant torque in a low-speed region while it is driven under a constant power in a high-speed region. Therefore, despite that the terminal voltage increases in proportion to the rotating speed under the constant torque region, the current in a constant power region may be small since the required torque is small. Thus, in such an region, it is preferable that the voltage is close to a constant value.

However, if the permanent magnet type rotating machine is applied to the above mentioned system, the induced voltage is increased in proportion to the rotating speed in the high-speed region. Consequently, the induced voltage is finally equal to voltage of an inverter, so that the machine fails to rotate. In order to attain the high-speed rotation, the voltage of inverter has only to be increased. In such a case, however, an apparent power of the inverter would increase, whereby the inverter is large-sized so that the efficiency is decreased.

Under the circumstances, there is applied a technique (i.e., flux-weakening) for lowering the field magnetic flux interlinking the armature windings by supplying the armature current as a d-axis component of the armature reaction, which acts in the opposite direction to the field magnetic flux. However, the relative permeability of permanent magnet represents a value of 1.1 close to the relative permeability (1.0) of vacuum and when viewing the field of the rotor from the armature, the resulting magnetic gap length will be the sum of a thickness of the permanent magnet and a mechanical gap length, which is too large. Therefore, in order to effectuate the flux-weakening, the d-axis armature current has to be enlarged remarkably, raising various problems in effectiveness and temperature. In addition, there is a possibility that a diamagnetic field by the armature reaction affects the permanent magnet directly, so that the magnetic characteristic is deteriorated for demagnetization.

Furthermore, in the above mentioned system, if the flux-weakening control gets out of order in the high-speed region, a high induced voltage of the machine may be applied on power-elements of the inverter, so that they may be broken electrically.

Under the above mentioned circumstances, embodiments described hereinafter are directed to a provision of the permanent magnet type rotating machines which are capable of rotating in a wide range from low-speed to high-speed by executing the flux-weakening control in a high-speed range to restrict the terminal voltage of machine, thereby attaining an operation at high power factor and high efficiency.

The sixth embodiment of the present invention is now described with reference to FIG. 13. According to the embodiment, the rotor core 7 is made of magnetic material of the carbon steel for machine structure (S45C) and the magnetic ring 9 consists of a plurality of magnetic rings laid to overlap each other, each of which is made from the silicon steel plate of ex. 0.5 mm in thickness, thereby providing the rotor 8.

In the so-constructed rotating machine, providing that a thickness of the magnetic ring 9 in the radial direction is also represented by Lr and a peripheral length of the permanent magnet 6 in the arc direction is also represented by τ, a relationship between Lr and τ of the embodiment is established as follows:

$$10<\tau/Lr<40$$

and more preferably;

$$12<\tau/Lr<25$$

When an amount of interlinkage flux at nearly zero in current, which may be caused under either a failure condition where a flux-weakening control cannot be operated or a no-load or light load condition, is smaller than an amount of interlinkage flux under a load condition of flowing current and when an improvement in characteristics of the machine is required, the thickness of the magnetic ring 9 is so established that a value of τ/Lr is within a range as below:

$$7<\tau/Lr<20$$

and more preferably;

$$8<\tau/Lr<12$$

Figure 14:
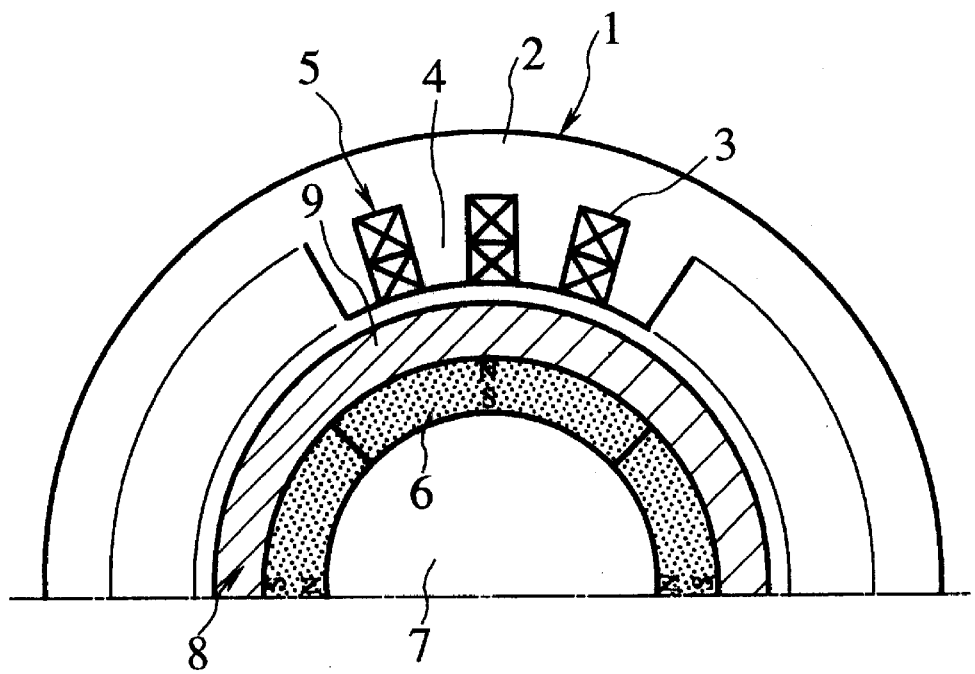
FIG. 14 is a cross sectional view of a half portion of a permanent magnet type rotating machine in accordance with a seventh embodiment of the present invention.

FIG. 14 shows a partial structure of the permanent magnet type of rotating machine in accordance with the seventh embodiment of the present invention.

Different from the above mentioned sixth embodiment, the magnetic ring 9 is made of any one of stainless steel (SUS630) of which saturation magnetic flux density is smaller than that of the silicon steel plate, magnetic material of which relative permeability is more than 100 and magnetic flux density thereof is from 0.5 T to 0.8 T, magnetic material of which relative permeability is less than 100 and magnetic flux density thereof is more than 1.6 T, dust core (see FIGS. 8 and 9) consisting of magnetic metal powder and resin compounds serving both insulation of said material and joining of said magnetic metal powder, ferrite (see FIG. 9) and amorphous magnetic material (see FIG. 10).

In the so-constructed rotating machine, the relationship between the thickness Lr of the magnetic ring 9 and the peripheral length τ of the permanent magnet 6 is established as follows:

$$8<\tau/Lr<30$$

and more preferably;

$$10<\tau/Lr<20$$

When an amount of flux linkage at nearly zero in current, which may be caused under either a failure condition where a flux-weakening control cannot be operated or a no-load or light load condition, is smaller than an amount of interlinkage flux under a load condition of flowing current and when an improvement in characteristics of the machine is required, the thickness of the magnetic ring 9 may be so established that a value of τ/Lr is within a range as below:

$$6<\tau/Lr<15$$

and more preferably;

$$7<\tau/Lr<10$$

The seventh embodiment of the present invention is described with reference to FIG. 3 since the structure of this embodiment is similar to that shown in the figure. In the embodiment, the stator 1 includes the stator core 2 which consists of the silicon steel plated laminated to each other. Similarly to the fifth embodiment, the rotor core 7 is made of magnetic material of the carbon steel for machinery parts (S45C). The magnetic ring 9 mounted on the inner peripheral surface of the stator core 2 is made of any one of magnetic material (ex. stainless steel (SUS630)) of which saturation magnetic flux density is smaller than that of a silicon steel plate, magnetic material of which relative permeability is more than 100 and magnetic flux density thereof is from 0.5 T to 0.8 T, magnetic material of which relative permeability is less than 100 and magnetic flux density thereof is more than 1.6 T, dust core consisting of magnetic metal powder and resin compounds serving both insulation of said material and joining of said magnetic metal powder, ferrite and amorphous magnetic material.

The eighth embodiment of the present invention is described with reference to FIG. 11 since the structure of this embodiment is also similar as that shown in the figure. Similarly to the third embodiment, the stator core 2 is provided at respective openings of the slots 5 with the magnetic wedges 18. The magnetic wedges 18 may be made of various materials, such as silicon steel plate, magnetic material of 0.5~0.8 T in magnetic flux density and more than 100 in relative permeability, magnetic material of 1.6 T in magnetic flux density and less than 100 in relative permeability, dust core consisting of magnetic metal powder and resin compound for insulating and joining the powder, ferrite material, amorphous magnetic material and so on.

In the afore-mentioned embodiments, the magnetic ring 9 and wedges 18 may be constituted by a plurality of elongated pieces each of which extends in an axial direction of the stator 1 and which are laid to overlap each other in a circumferential direction thereof. Alternatively, the magnetic ring 9 and wedges 18 may be constituted by a plurality of thin plates each of which is so shaped as to have a cross section shown in the figures and which are laid to overlap each other in an axial direction of the stator 1. It is noted that, as methods of overlapping the above elongated pieces and the thin plates, there may be adopted electron beam welding, laser welding, joining by adhesive agent, integral molding by means of resin and so on.

Figure 15:
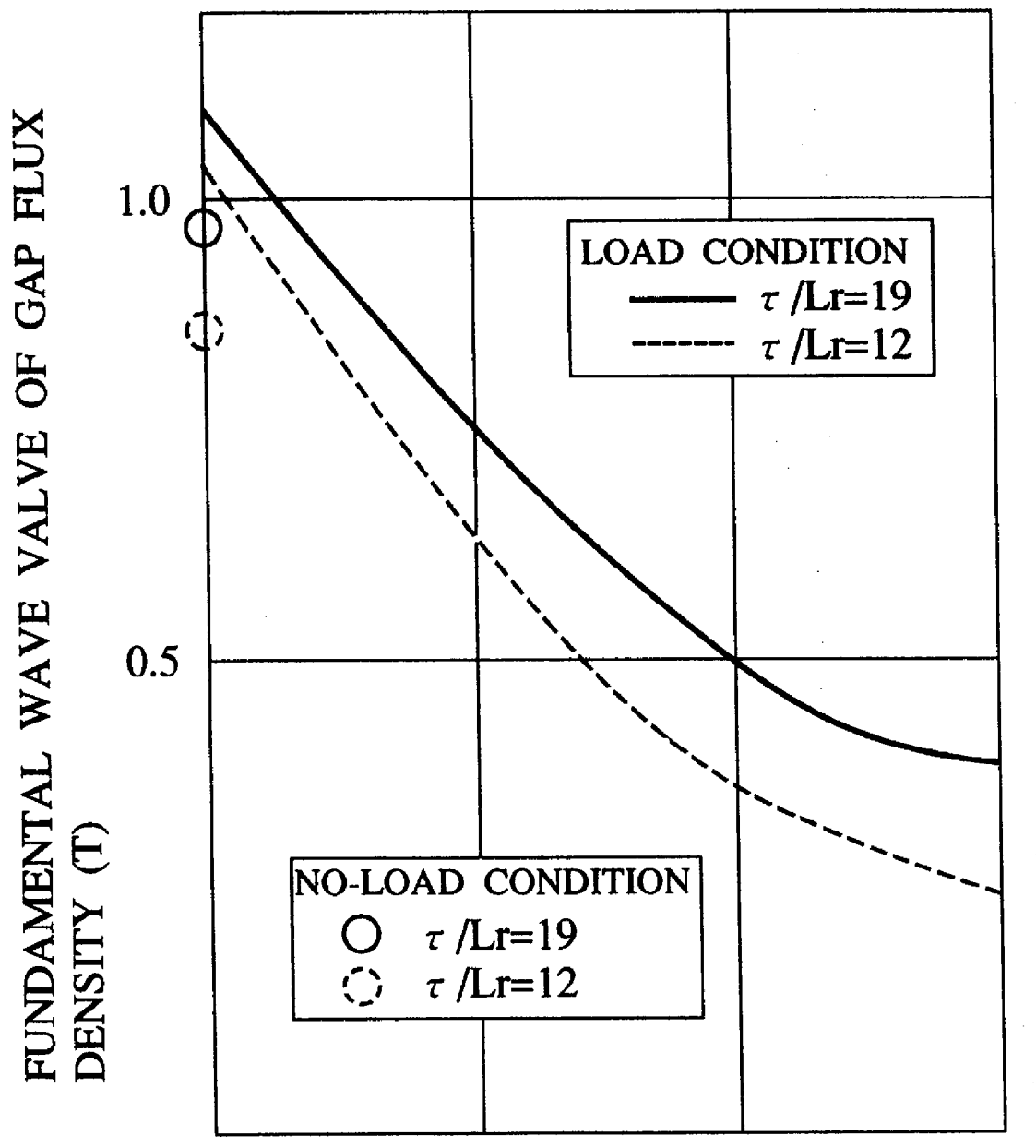
FIG. 15 is a diagram showing a relationship between a fundamental wave value of gap flux density and a phase difference between induced voltage and current, in the magnetic ring of silicon steel plates.

FIG. 15 shows respective relationships between a value of fundamental wave of the magnetic-flux density at gap and a phase difference between the induced voltage and the current, under a no-load condition without flux-weakening and a loaded condition with flux-weakening in cases that the above magnetic rings are respectively formed to be of 12 and 19 in τ/Lr and made from the silicon steel plates. Note, the shown relationships have been obtained by analyzing an electromagnetic field, using the finite element method.

Figure 16:
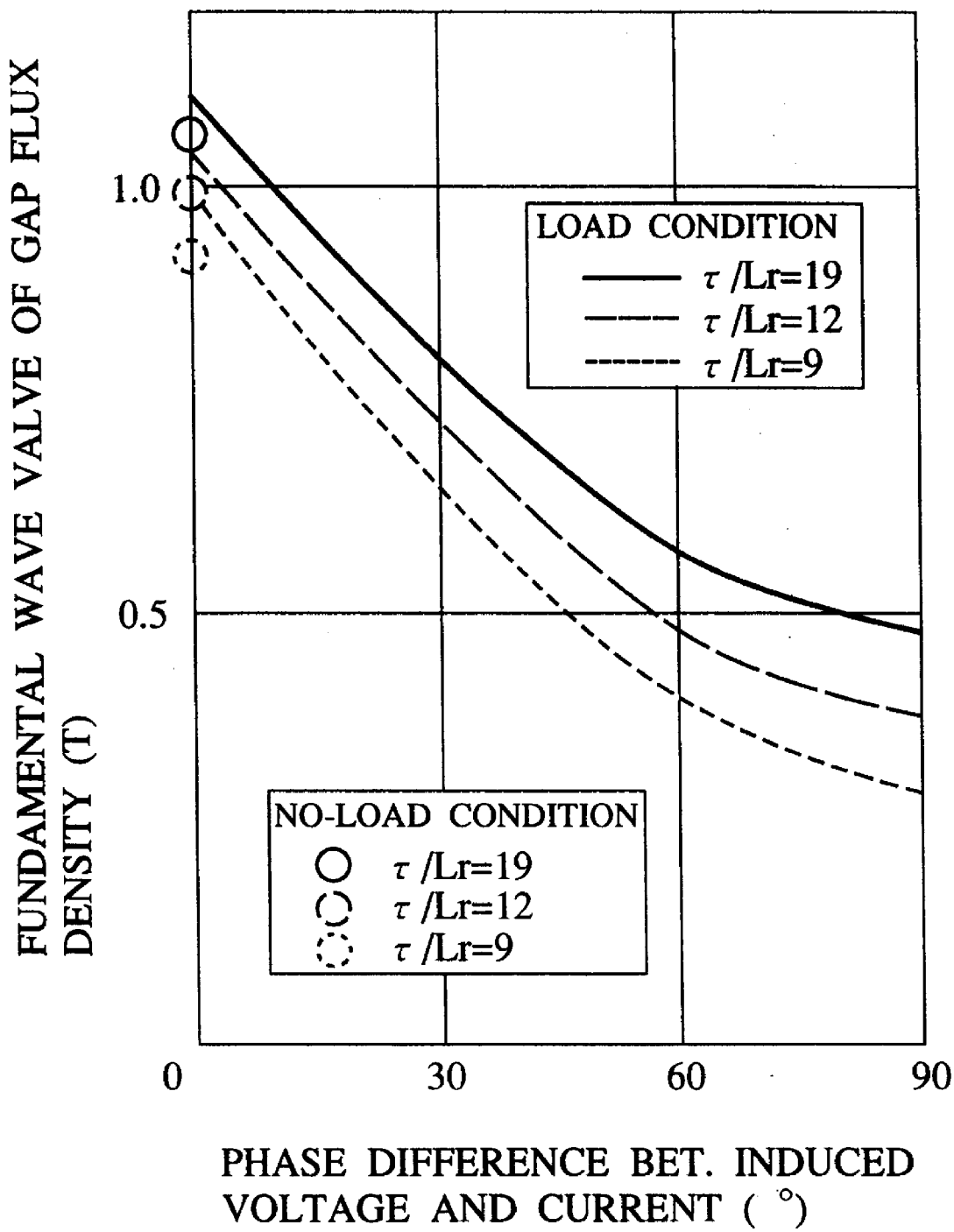
FIG. 16 is a diagram showing a relationship between a fundamental wave value of gap flux density and a phase difference between induced voltage and current, in the magnetic ring of SUS630.

Similarly, FIG. 16 shows respective relationships between the value of fundamental wave of the magnetic flux density at gap and the phase difference between the induced voltage and the current, under the no-load condition without flux-weakening and the loaded condition with flux-weakening in cases that the magnetic rings are made from the stainless steel of SUS630 to be of 9, 12 and 19 in τ/Lr, respectively.

Figure 13:
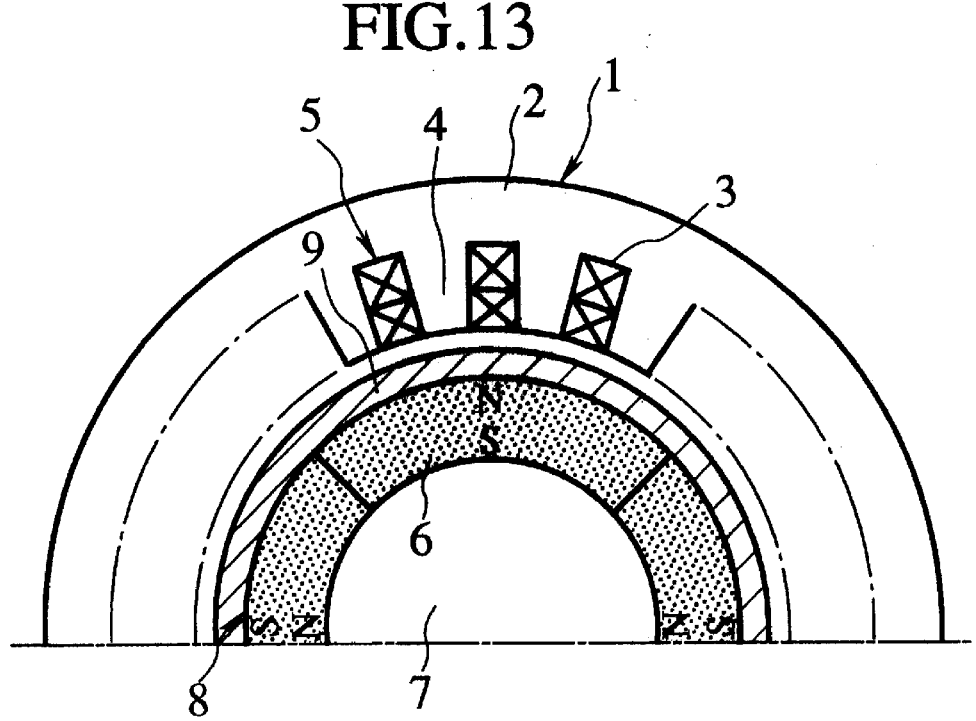
FIG. 13 is a cross sectional view of a half portion of a permanent magnet type rotating machine in accordance with a sixth embodiment of the present invention.
Figure 17:
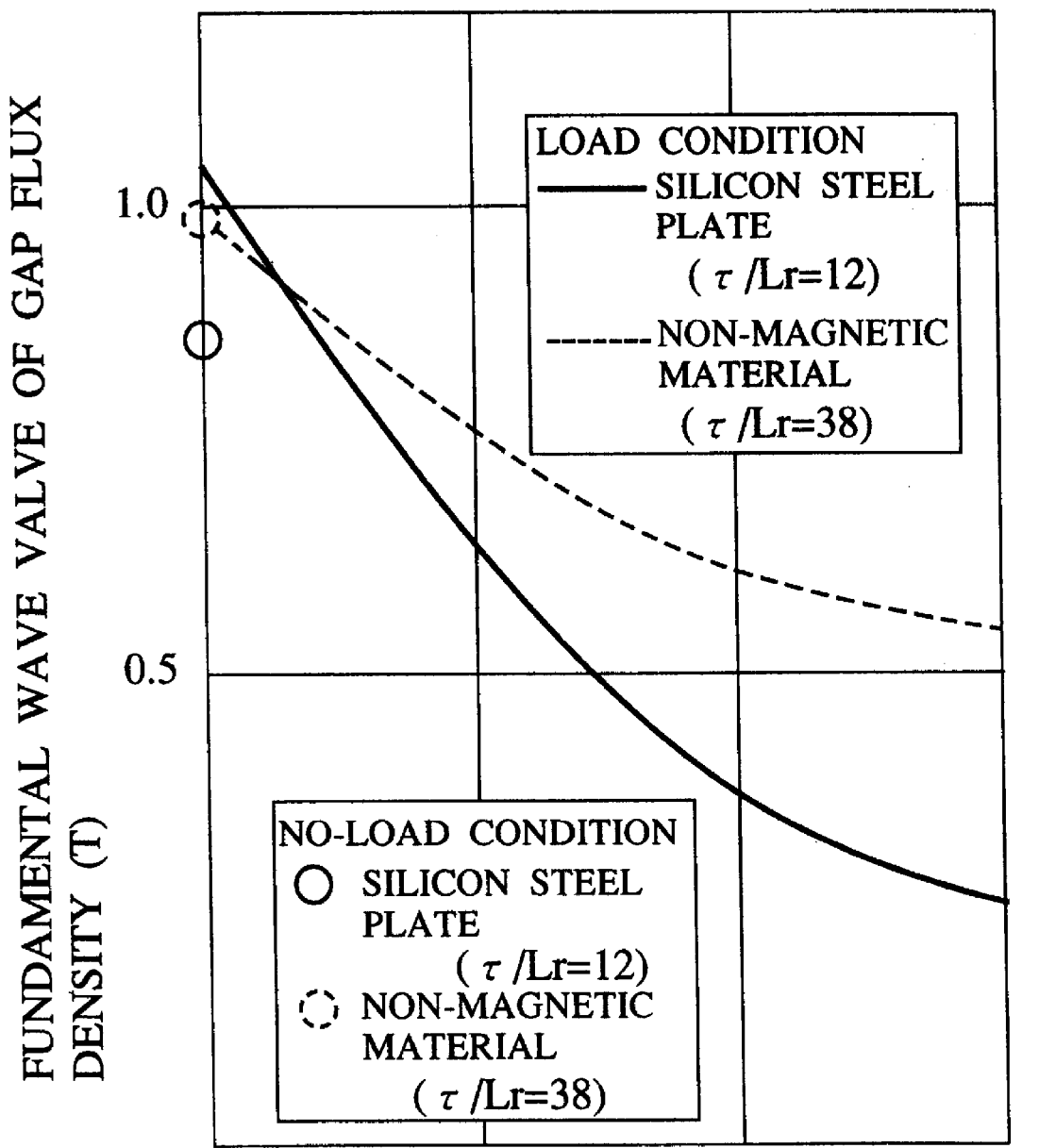
FIG. 17 is a diagram showing a relationship between a fundamental wave value of gap flux density and a phase difference between induced voltage and current, in both cases that the magnetic ring of FIG. 13 is made from the silicon steel plates and that the magnetic ring is made of non-magnetic material in the conventional machine.

FIG. 17 shows respective relationships between the value of fundamental wave of the magnetic flux density at gap and the phase difference between the induced voltage and the current, under the no-load condition without flux-weakening and the loaded condition with flux-weakening, in cases that the magnetic ring 9 shown in FIG. 13 is made from the silicon steel plates (τ/Lr=12) and that the magnetic ring is made of non-magnetic material (τ/Lr=38).

Figure 18A:
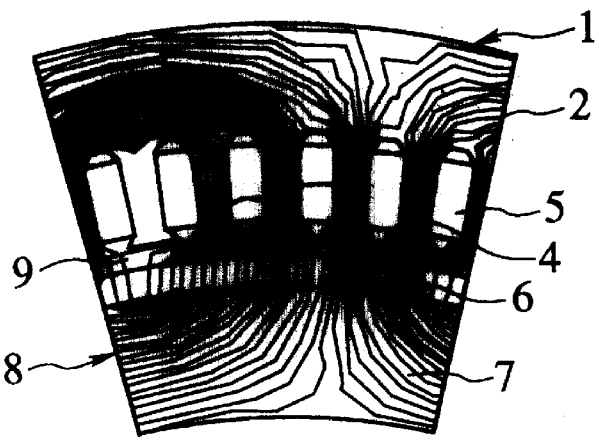
FIGS. 18A, 18B, 18C show distributions of flux lines about the single permanent magnet of FIG. 13, in case of 0°, 60° and 90° in the phase difference, respectively.
Figure 18B:
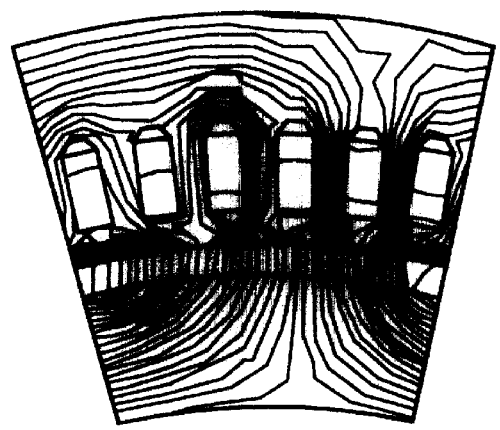
Figure 18C:
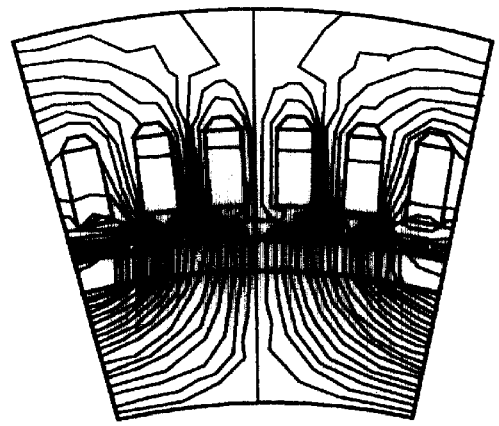

FIGS. 18A, 18B, 18C show magnetic flux lines of the single permanent magnet (τ/Lr=19), which have been also obtained by the electromagnetic field analysis using the finite element method, under such loaded conditions that the phase difference between the induced voltage and the current is established to be 0°, 60° and 90°, respectively, in the rotating machine in accordance with the sixth embodiment shown in FIG. 13.

FIGS. 19A, 19B, 19C also shows magnetic flux lines of the single permanent magnet (τ/Lr=19), which have been also obtained by the electromagnetic field analysis using the finite element method, under such loaded:conditions that the phase difference between the induced voltage and the current is established to be 0°, 60° and 90° respectively, in the rotating machine in accordance with the seventh embodiment shown in FIG. 14.

Figure 20:
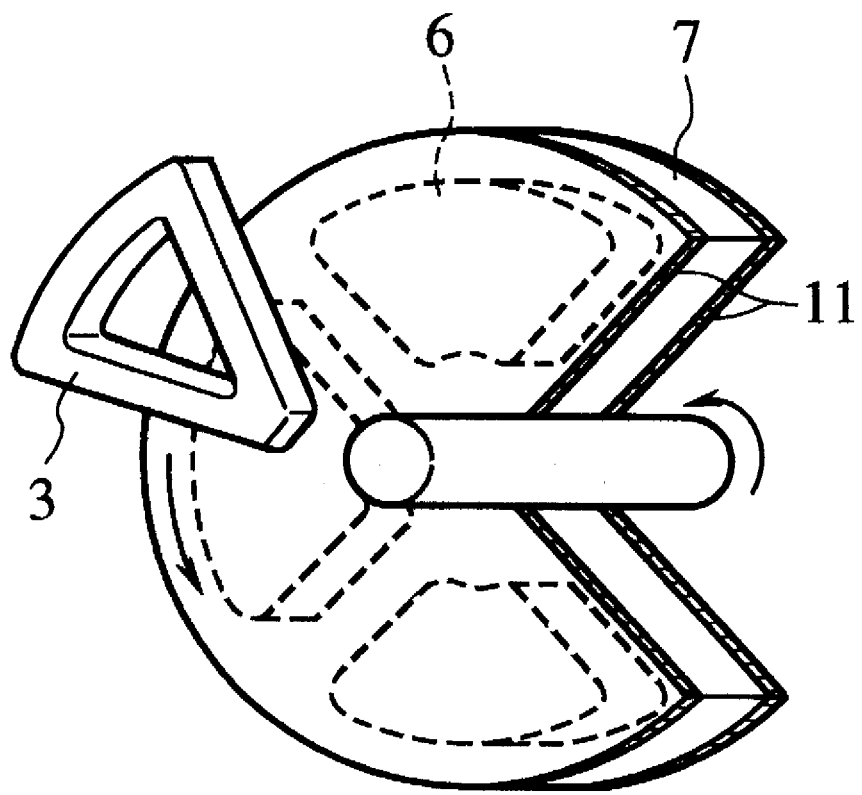
FIG. 20 is a perspective view of a rotor of a permanent magnet type rotating machine in accordance with an eighth embodiment of the present invention, showing a partial cross section of the rotor.

FIG. 20 is a perspective view of a rotor (partial) as a constituent of a permanent magnet type of rotating machine in accordance with the eighth embodiment of the invention. Also in the figure, reference numeral 3 designates a coil (stator windings), 6 the permanent magnet, 7 the stator core, and 11 circular magnetic discs instead of the aforementioned magnetic ring 9. According to the embodiment, the magnetic discs 11 are attached on both side faces of the rotor 7, providing a so-called "axial gap" type of rotating machine.

The respective operations of the present rotating machines in accordance with the above mentioned embodiments (from 6th. to 8th. embodiment) will be described hereinafter.

First, in the conventional permanent magnet type of rotating machine, when viewing the rotor from the armature, the relative permeability of the permanent magnet becomes to be approximately 1, which is equal to that of vacuum. Thus, the magnetic gap length in the conventional machine will be the sum of a mechanical gap length and a thickness of the permanent magnet, which is remarkably large (5~10 times) in comparison with that of the general rotating machine. Therefore, it is required of a considerable armature to weaken a field of the rotor by the armature reaction. Consequently, since the effect of weakening-field caused by the armature is small, it is impossible to enlarge the high-speed rotational region to a great extent. If flowing the large current forcibly, an ohmic loss of the coil will be increased and the power factor gets worse, so that the capacity of inverter is increased. Further, there may be raised a possibility that a diamagnetic field by the armature reaction is applied on the permanent magnet thereby to demagnetize it.

On the contrary, according to the present permanent magnet type of rotating machine, since the magnetic ring is arranged on the outer periphery of the rotor, the magnetic gap length becomes to be equal to the mechanical gap length, so that the armature reaction field owing to the armature is strengthened. In addition, owing to the armature reaction field, a part of magnetic flux that the permanent magnets produce repulses and then it forms both a neighboring polar and a magnetic circuit through the intermediary of the magnetic ring as a magnetic path, positively. Consequently, it is possible to reduce an amount of field magnetic flux interlinking the armature windings effectively.

Furthermore, according to the above mentioned embodiment, since the value of τ/Lr is established to be within the range of 10<τ/Lr<40, and more preferably, 8<τ/Lr<30, when the failure where the flux-weakening control cannot be operated occurs (d-axis current: 0), a large amount of magnetic flux that the magnetic ring of a considerable thickness generates under a no-load or light-load condition, will leak out into the neighboring magnet through a circumferential magnetic path of the magnetic ring. Therefore, under such conditions, the magnetic flux interlinking the armature windings is decreased.

Thus, according to the embodiment, when it becomes to be impossible of attaining the weakening-field control at a high-speed region, it allows the induced voltage of the rotating machine to be diminished relatively. Consequently, it is possible to prevent a power element of an inverter drive circuit from being broken by an excessive induced voltage. Additionally, since the magnetic flux for the armature will be decreased under even the light-load condition that the armature current is small, the electromagnetic loss can be reduced.

In either a load region with low and middle speed rotations or a constant-torque region, the armature current (i.e., q-axis current) for generating torque is supplied. In such a case, since not only field magnetic flux but magnetic flux of the armature pass through the magnetic ring, a permeability thereof is lowered, so that the flux which leaks to the circumferential direction of the magnetic ring is decreased thereby to increase the interlinkage magnetic flux. Therefore, it can be obtained an effect similar to that brought by the strengthening-field control, equivalently in comparison with a case under the light load condition driving. The above effect can be confirmed by the lines of 12 in τ/Lr of FIG. 15 where the fundamental wave value of the gap magnetic flux density under the no-load condition is smaller than that in case of supplying only the q-axis current under the load condition by 17%, representing an effect of the strengthening-field control remarkably.

On the other hand, in the high-speed rotational region, by supplying an optional d-axis current (flux-weakening control), the field magnetic flux can flow to the neighboring polar positively through the magnetic ring as magnetic path owing to the armature reaction and the field magnetic flux interlinking the armature windings can be diminished effectively. Further, compared with the case of τ/Lr=12 of FIG. 15 and the other case of flowing of the q-axis current, when the weakening-field control is executed under condition of 60° in phase reference between the induced voltage and the current, the fundamental wave value of magnetic flux density at the gap is lowered by 64%, which represents an effect brought by the weakening-field to be considerable. Consequently, it is possible to lower the terminal voltage of the motor, thereby enlarging the high-speed rotational region.

In addition, since a thickness of the above magnetic ring is relatively large, it can also provide a firm mechanism for holding the permanent magnets thereby to increase its limit rotating speed.

In case that the value of $\tau/Lr$ is established to be within the range of $10<\tau/Lr<40$, and more preferably, $12<\tau/Lr<25$, the operation of flux-weakening at high-speed ($\tau/L=19$ of FIG. 15) is sufficiently effected as similar to the above mentioned case, although there is little effect of the field-strengthening in case of flowing the current in the regions of a low and middle rotational speeds. Consequently, the amount of magnetic flux at which the field magnetic flux interlinks the armature windings is decreased effectively, whereby the terminal voltage of motor can be lowered thereby to enlarge the high-speed rotational region.

In FIG. 17, it will be understood that the effect of the field-strengthening and flux-weakening in case of the magnetic ring of non-magnetic material differs from that in case of the magnetic ring of silicon steel plate obviously. Furthermore, it will be understood that a variable range of flux (voltage) corresponding to changes in phase difference between the induced voltage and the current is considerably large in the magnetic ring of silicon steel plate, thereby enabling of driving the machine at a wide range of variable speeds. As the flux (voltage) can be changed with a small phase angle, it is possible to reduce the d-axis current. Accordingly, according to the embodiment, a phase current is diminished and an ohmic loss is decreased thereby to improve the efficiency of the machine.

In addition, in case that the magnetic ring is made of magnetic material of which saturation magnetic flux density is small, the permeability drops in even low magnetic field to be in a condition close to the saturation. In order to flow the field magnetic flux along the circumferential direction of the magnetic ring by the armature reaction effectively, it is necessary to increase a thickness of the magnetic ring in comparison with that of magnetic ring made of the silicon steel plate.

When both the field-strengthening and flux-weakening are required together, the value of $\tau/Lr$ is established to be within the range of $6<\tau/Lr<15$, and more preferably, $7<\tau/Lr<10$. In case that the strengthening-field is not required, it would be effective, providing that the value of $\tau/Lr$ is within the range of $8<\tau/Lr<30$, and more preferably, $10<\tau/Lr<20$. This magnetic material has a low saturation magnetic flux density in comparison with that of the silicon steel plate. Therefore, in order to form a magnetic circuit where the field magnetic flux extends to the neighboring polar through the magnetic ring, it is necessary to increase a thickness of the magnetic ring in comparison with that of magnetic ring made of the silicon steel plate. Consequently, comparing with the above case where the magnetic ring of the silicon steel plate is used, it can also provide a firm mechanism for holding the permanent magnets thereby to further increase its limit rotating speed.

On condition that the magnetic ring has the above mentioned thickness, by adjusting an intensity of the armature reaction caused by the d-axis current, it is possible to control the amount of field magnetic flux interlinking the armature windings, i.e., the terminal voltage of the rotating machine effectively.

That is, according the embodiments, since the weakening-field is not carried out within the range from low-speed to middle-speed rotation, a brushless DC motor is driven by the q-axis current that generates a torque, upon making the d-axis current zero. In the high-speed rotational region, by flowing the optional d-axis current thereby to decrease the field magnetic flux, the terminal voltage of the motor can be reduced.

In case of arranging the magnetic ring on the stator's side, since it is magnetically connected in a short-circuit with the stator core and a gap is defined between the magnetic ring and the permanent magnets of the rotor, such an effect as mentioned above can be obtained although the magnetic flux which leaks in the circumferential direction of the field magnetic flux is decreased in comparison with the other embodiments in which the rotor is provided with the magnetic ring.

On the other hand, the demagnetization due to the armature reaction of the permanent magnets can be prevented as follows. That is, if receiving the armature reaction by the d-axis current, the magnetic flux of the magnets can change the magnetic path from the stator core to magnetic ring, so that the magnetic circuit is not opened and it is possible to prevent the permeance coefficient from falling in a great extent. In this way, it is possible to avoid the demagnetization due to the armature reaction on the magnets. Note, the operation of the magnetic wedges is also similar to the above mentioned operation of the magnetic ring.

Further, when the rotor rotates at high-speed in the multipolar machine, an eddy current occurs in the magnetic ring and wedges, whereby the loss will be produced. In such a case, by laminating the magnetic ring or wedges on each other so as to be in parallel with the field magnetic flux, it is possible to diminish the eddy current.

Note, as shown in FIG. 9, both the dust core and the ferrite represent slight drops in magnetic flux density i.e., a fall of permeability) in even a high-frequency region. Therefore, it will be understood that, in even a case that the magnetic ring or wedges is not laminated on each other but is integrally formed, these materials can reduce the eddy current. Accordingly, when the dust core and ferrite material are applied on the present rotating machine, the characteristics will be improved in spite of its simple structure.

In common with the above mentioned embodiments, since the permanent magnet type rotating machine is provided in the gap with the magnetic ring or it is provided at the slots of the stator core with the magnetic wedges, the flux passing through the teeth of the stator core is varied smoothly by the magnetic ring and wedges thereby to decrease the changing ratio of magnetic energy, so that it is possible to reduce the cogging torque which is caused by a difference in magnetic reluctance between the slot and the teeth of the stator.

Figure 21:
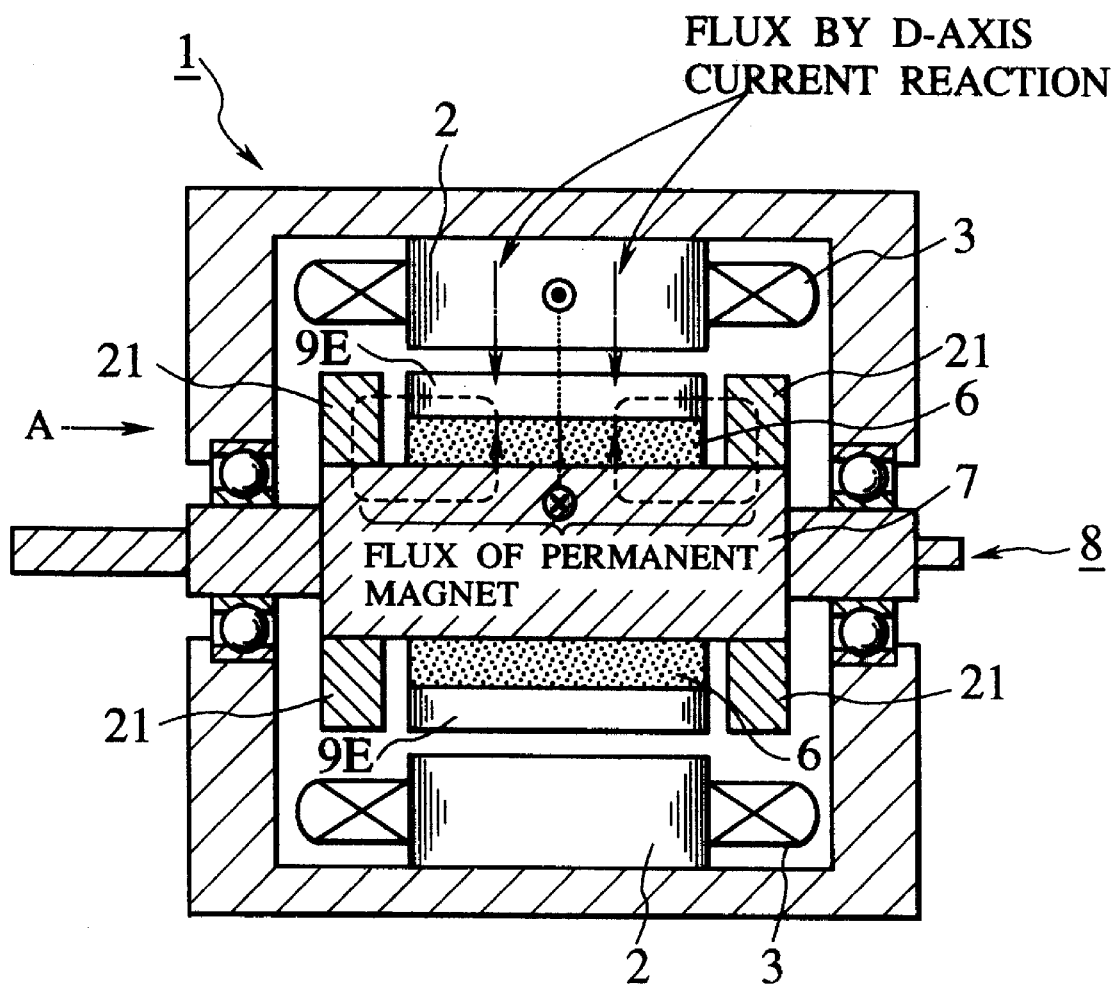
FIG. 21 is a longitudinal cross sectional view of a permanent magnet type rotating machine in accordance with a ninth embodiment of the present invention.
Figure 22:
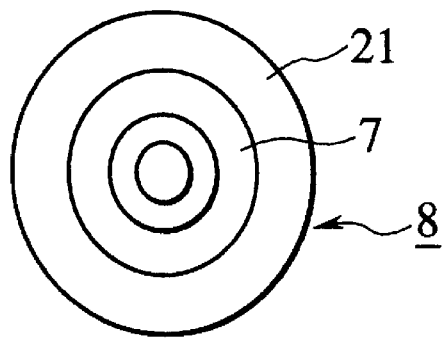
FIG. 22 shows a rotor viewed from a direction of an arrow A of FIG. 21.
Figure 23:
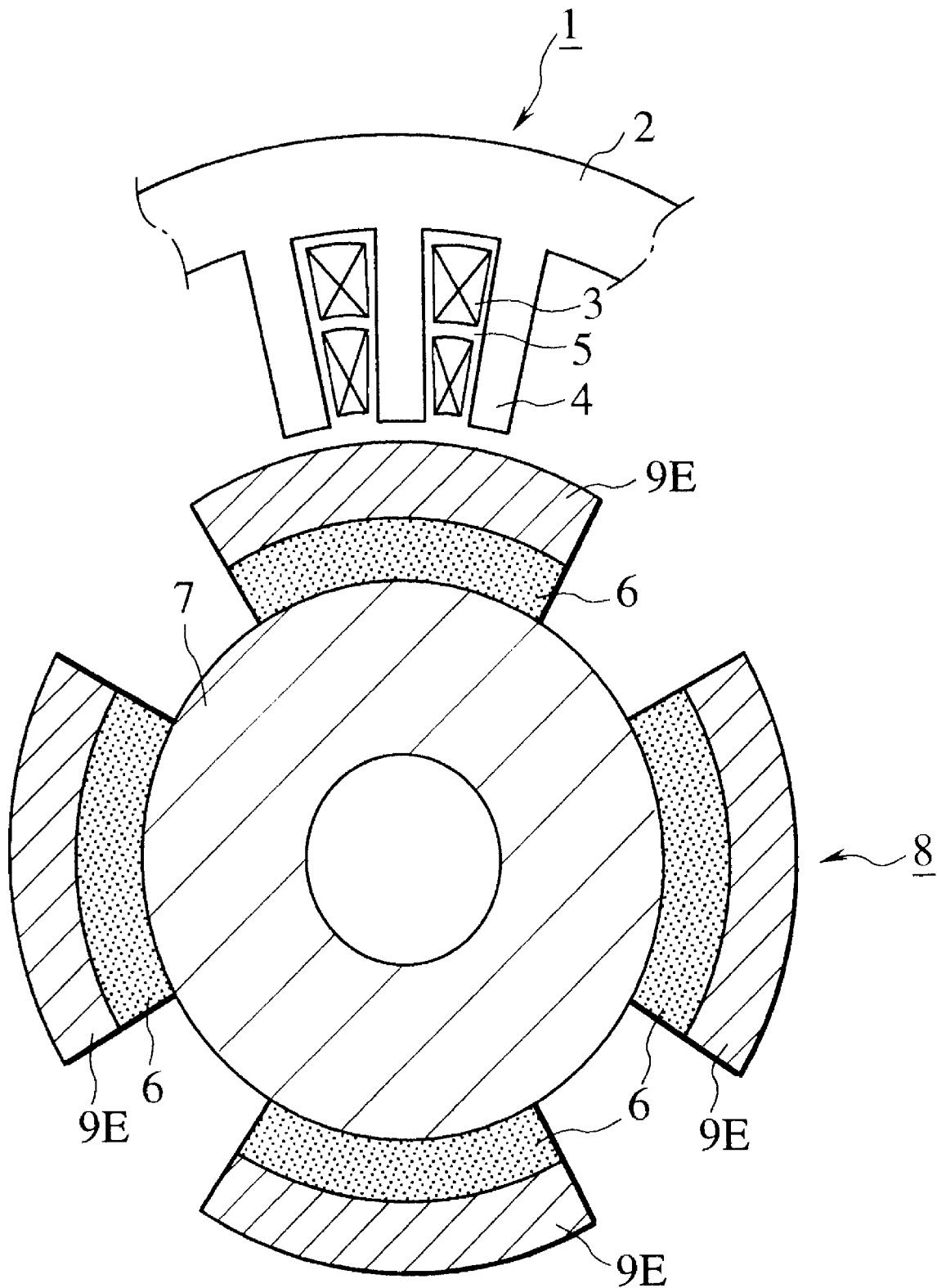
FIG. 23 is a cross sectional view of a main portion of the permanent magnet type rotating machine of FIG. 21.

We describe the ninth embodiment of the present invention with reference to FIGS. 21 to 23. Note, this embodiment is also directed to a provision of a permanent magnet type of rotating machine which is capable of rotating in a wide range from low-speed to high-speed thereby attaining its operation with a high power factor and high efficiency.

The stator 1 includes the stator core 2 which consists of laminated silicon steel plates. The stator core 2 is provided on the inner periphery with the slots 5 and the teeth 4 which are formed alternately. The armature windings (coil) 3 is wound about the teeth 4, thereby providing an armature of the machine.

In the rotor 8, the rotor core 7 is made of magnetic material of the carbon steel for machine structure (S45C) and four permanent magnets 6 of Nd/Fe/B alloy are arranged on the circumferential surface of the rotor core 7 at same intervals in the circumferential direction. These permanent magnets 6 constitute a main field system of the rotating machine. Mounted on respective surfaces of the permanent magnets 6 are magnetic members 9E which face the inner periphery of the rotor core 7 through the gap. According to the embodiment, end rings 21 are provided at both axial ends of the rotor core 7, respectively. Each end ring 21 of magnetic material is positioned apart from the magnetic member 9E through a suitable clearance.

As material of the magnetic members 9E, any one of silicon steel plate, Fe/Co/V alloy, magnetic stainless steel, amorphous magnetic material, dust core consisting of magnetic metal powder and resin compound for insulating and joining the powder and ferrite material may be used. Regarding silicon steel plate, Fe/Co/V alloy, magnetic stainless steel and amorphous magnetic material, the magnetic member 9E can be provided by laminating a thin plate of approx. 0.5 mm in thickness on each other. In case of forming the magnetic member 9E of the others (dust core, ferrite material), the solids are used for the member 9E.

The end ring 21 may be made of any one of soft steel, carbon steel for machinery parts (S45C), the same material as the magnetic member 9E (silicon steel plate, Fe/Co/V alloy, magnetic stainless steel, amorphous magnetic material) and may be constituted by either the above lamination or the solid. The permanent magnets 6 are fixed to the rotor core 7 by means of adhesive agent, bolts or the like. Similarly, the magnetic members 9E are fixed to the rotor 8 by means of adhesive agent, bolts, axial bars or the like.

The above constructed rotating machine operates as follows.

According to the embodiment, when viewing the rotor 8 from the armature, since the magnetic members 9E are arranged on the surfaces of a field of the rotor 8, the magnetic gap length becomes to be equal to the mechanical gap length, so that the armature reaction field owing to the armature is strengthened. Thus, since an effect of flux-weakening by the armature reaction is developed, it is possible to enlarge the high-speed rotational region.

We now describe an operation of this flux-weakening in sequence. In order to execute a constant power drive at the high-speed region, the flux-weakening control to decrease the field magnetic flux is carried out since an induced voltage of the machine is increased, where the driving with high power factor and high efficiency can be realized.

In the present invention, when executing the flux-weakening control by d-axis current, the magnetic flux of the permanent magnets 6 is repulsed by the armature reaction of the d-axis current and then the field magnetic flux changes the magnetic path toward the magnetic end rings 21 of which magnetic field of the armature reaction is weak. Consequently, there is formed a new magnetic circuit represented by a cycle of "rotor core 7→permanent magnet 6→magnetic member 9E→end ring 21→rotor core 7" besides a normal magnetic circuit of a cycle of "rotor core 7→permanent magnet 6→stator core 2→permanent magnet 6→rotor core 7", as shown in FIG. 21. That is, since a part of flux of the permanent magnets 6 passes through the new magnetic circuit, the magnetic flux interlinking the armature windings 3 is so decreased that the flux-weakening operates effectively, the power factor and efficiency of machine can be progressed.

The reduction of influence on the weakening-field by magnetic saturation will be described hereinafter. Provided that the magnetic ring as magnetic path is arranged between the stator core and the rotor, both d-axis flux and q-axis flux pass therethrough, so that the magnetic saturation may occur on condition that the current is large and the effect of weakening-field may be reduced. On the contrary, since the end rings 21 are positioned outside the stator core 2 in the rotating machine of the embodiment, most of the q-axis flux generated by q-axis current for producing a torque does not pass through the end rings 21 but flux of the permanent magnets 6, of which magnetic path is changed so as not to interlink the stator 1 by the d-axis armature reaction, passes through the end rings 21. Thus it is possible to supply larger d-axis current to the machine. Furthermore, because of less influence by the q-axis current, such as magnetic saturation of magnetic materials, the controllability can be improved. In addition, when an interpole section of the rotor core 7 is not shaped to protrude as shown in FIG. 23, there will be defined a space in an interpole section of the q-axis in comparison with d-axis reactance thereby to diminish q-axis reactance. Therefore, in the shown embodiment, due to the reduced q-axis flux, it is possible to reduce the influence on magnetic saturation further.

We describe the demagnetization of the permanent magnets 6. According to the embodiment, receiving the armature reaction by the d-axis current, the magnetic path of part of the flux of the permanent magnets 6 is shifted from the stator core 3 to the end rings 21, so that the permeance coefficient determining an operational characteristic of the permanent magnets 6 is saved from falling at a great extent, thereby stabilizing them magnetically. Accordingly, it is possible to avoid the permanent magnets 6 from being demagnetized by the armature reaction.

In case that the interpole section of the rotor core 7 is shaped so as not to project as shown in FIG. 23, the space is defined in the interpole section of the q-axis in comparison with the d-axis reactance thereby to diminish the q-axis reactance. Thus an impedance in viewing the rotating machine from a driving power source becomes to be small, whereby a capacity of driving power source can be reduced.

With the above mentioned various operations, when the magnetic members 9E are made of Fe/Co/V alloy, it is possible to enlarge the armature current for flux-weakening in comparison with a case of using the magnetic members made from the silicon steel plate, since the high saturation magnetic flux density of Fe/Co/V alloy is 2.3 T. Accordingly, an use of the above material would be more effectively in cases that they are required to increase the weakening-field and to decrease a thickness of the magnetic member 9E.

In such cases as follows; a case that it is required of high efficiency for the machine, a case that the rotor rotates at high-speed, a case of the multipolar rotating machine, and a case that the armature slots are opening slots, it is possible to reduce the eddy current by forming the magnetic member 9E by laminating the silicon steel plates on each other, each of which having a thickness of 0.5 mm, for example. Alternately, in application of the dust core and the ferrite material for the magnetic member 9E, these materials represent a little fall in magnetic flux density (corres. a fall of permeability) at even high-frequency, which means that the eddy current can be also reduced by an integrally-formed member, not the laminated one. Therefore, when applying the dust core and the ferrite material, it is possible to provide a rotating machine of superior characteristic with a simple structure. Note, magnetic characters of the above materials can be also confirmed by FIGS. 7 to 10.

Figure 24:
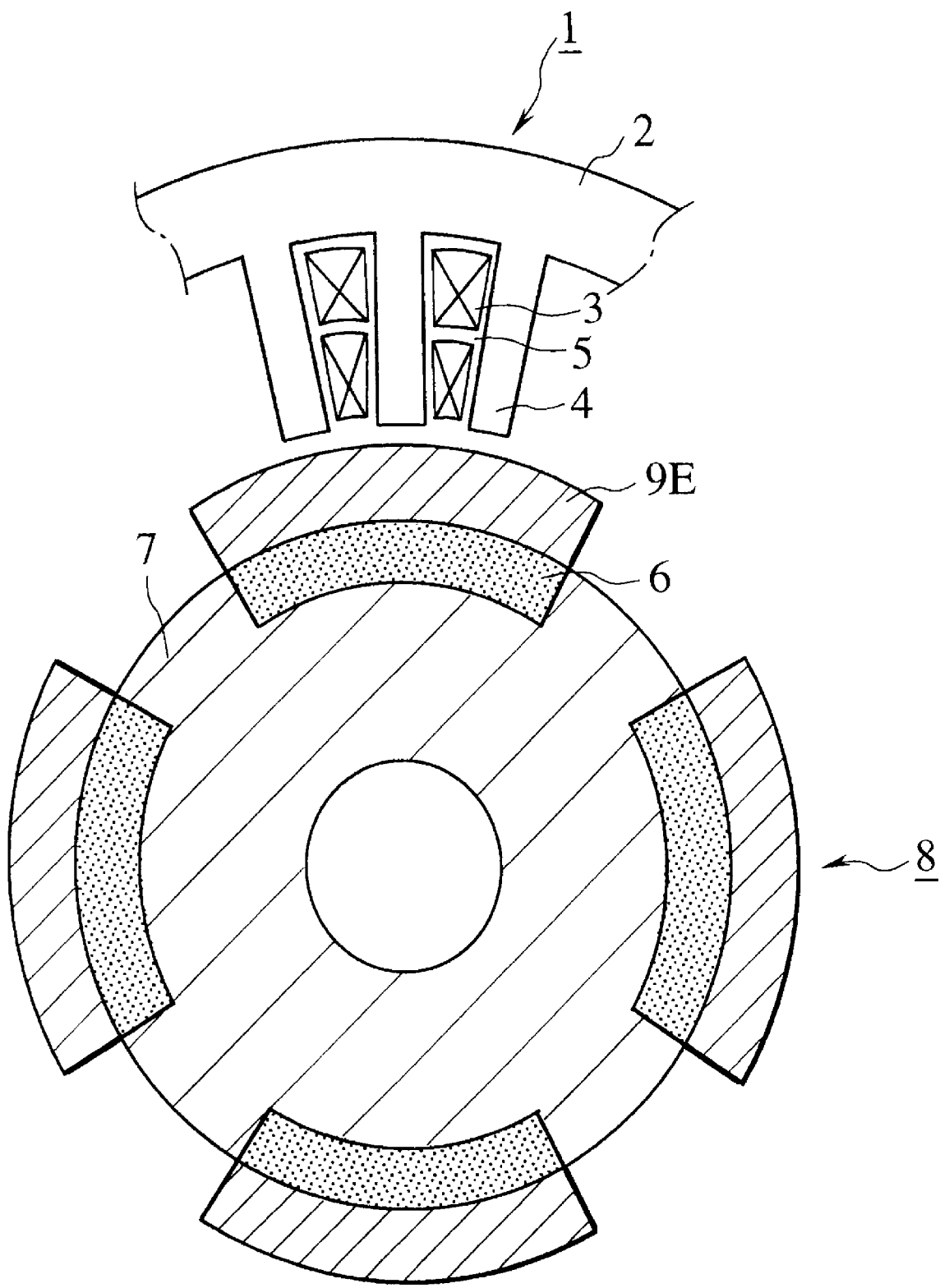
FIG. 24 is a cross sectional view of a main portion of a permanent magnet type rotating machine in a modification of the ninth embodiment of the present invention.

FIG. 24 is a cross sectional view of the machine in a modification of the ninth embodiment of the invention. In the modification, the permanent magnets 6 are embedded in the rotor core 7. Although the operation is similar to that of the above mentioned embodiment, it will be understood that the arrangement allows the rotor 8 to be miniaturized.

In summary, according to the tenth embodiment, since it is possible to control an amount of the interlinkage flux of the armature windings by the permanent magnets 6 effectively, it allows the rotating machine to be driven in a wide range from low-speed to high-speed and the rotation of high power factor and high efficiency can be realized.

Figure 25:
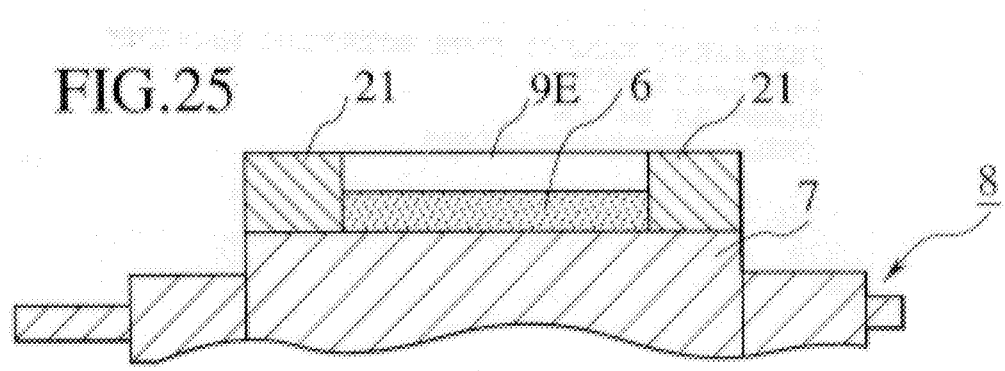
FIG. 25 is a longitudinal cross sectional view of a part of a permanent magnet type rotating machine in accordance with a tenth embodiment of the present invention.

FIG. 25 shows the tenth embodiment of the present invention. In the embodiment, the end rings 21 are arranged so as to be in contact with the magnetic members 9E through no magnetic gap. With the arrangement, various elements attached on the rotor 8 are integrated to reinforce a structure of the rotating machine itself although the leak of flux is increased.

Figure 26:
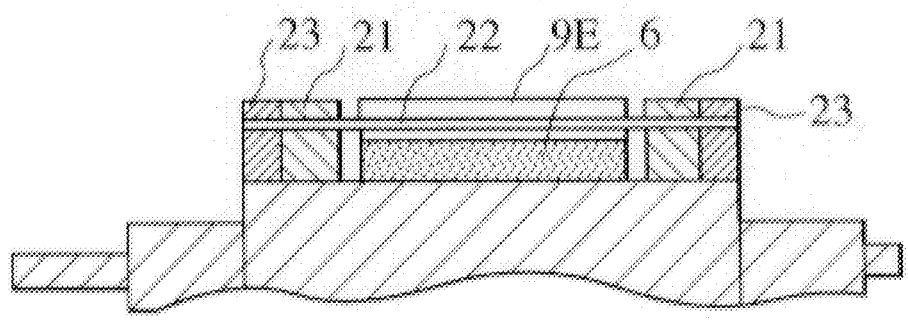
FIG. 26 is a longitudinal cross sectional view of a part of a permanent magnet type rotating machine in accordance with an eleventh embodiment of the present invention.
Figure 27:
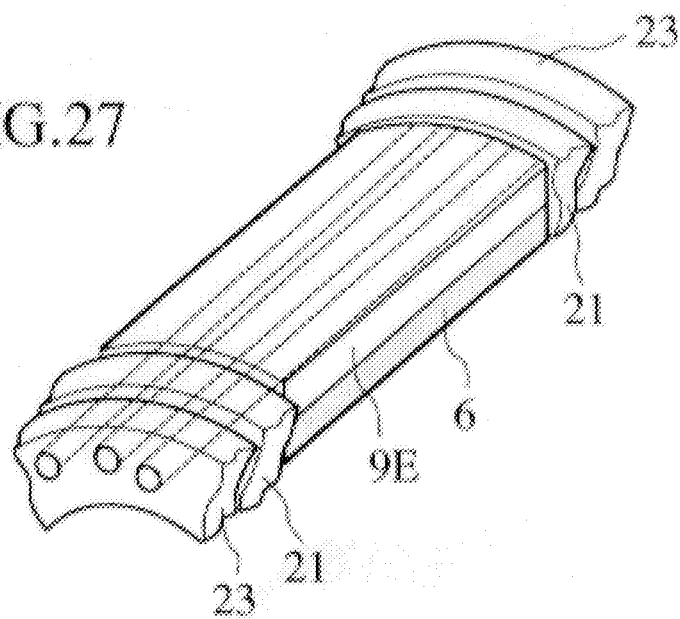
FIG. 27 is a perspective view of the permanent magnet type rotating machine of FIG. 26.

FIGS. 26 and 27 show the eleventh embodiment of the present invention. In the general permanent magnet type rotating machine, when an abrupt load fluctuation occurs, there is no way but the operation is stabilized by controlling the driving power source. In a power generation system requiring the power source of high quality, however, it is very difficult for the conventional permanent magnet type rotating machine to stabilize the operation of electric system.

This embodiment is directed to solve such a problem. According to the embodiment, upon forming a plurality of through-holes in the magnetic members 9E to the axial direction, damper bars 22 are inserted into the through-holes, respectively, and both axial ends of each damper bar 22 are respectively connected to conductive short-circuit rings 12 mounted on the rotor core 7.

With the above arrangement, when the abrupt load fluctuation occurs, braking effect is exerted on the rotor 8 due to the damper bar 22, so that the rotation of machine can be stabilized.

Figure 28:
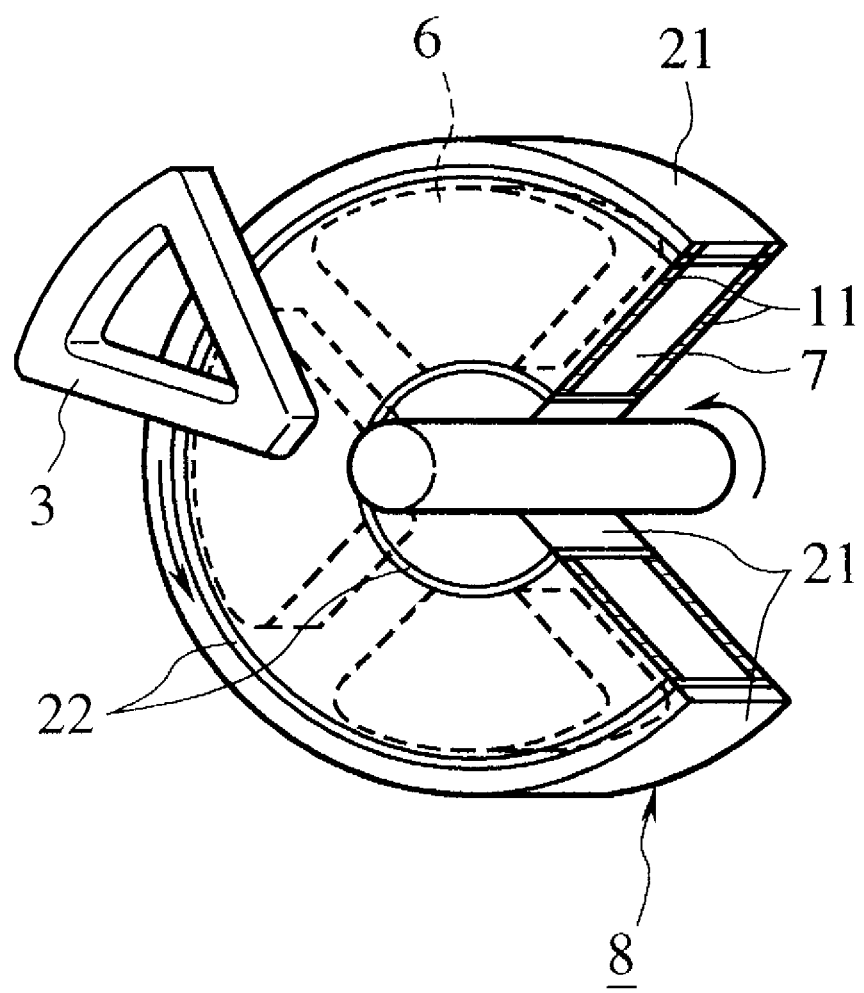
FIG. 28 is a perspective view of a rotor of a permanent magnet type rotating machine in accordance with a twelfth embodiment of the present invention, showing a partial cross section of the rotor.

FIG. 28 shows an axial-gap type rotating machine in accordance with the twelfth embodiment of the present invention, in which a disc-shaped stator and a rotor are arranged to oppose to each other through a predetermined gap. In the embodiment, the armature windings 3 are wound about the not-shown stator core of the stator, thereby providing the armature. Similarly, a plurality of permanent magnets 6 are arranged in the rotor core 7 at the same intervals in the circumferential direction. The magnetic members 11 are attached on the surfaces of the permanent magnets 6 on the gap side. The magnetic end rings 21 are arranged on the inner and outer peripheries of the rotor core 7 through the intermediary of non-magnetic members 22. Due to these non-magnetic members 22, the magnetic end rings 21 are positioned apart from the ends of the magnetic members 11 by predetermined clearances. The operation and effect of the above mentioned rotating machine are similar to those of the 10th. embodiment present machine.

Although the above mentioned embodiments are all directed to the permanent magnet and revolving-field type rotating machine, an operation and effect similar to that would be expected in another type rotating machine where a stator such as a D.C. motor provides the permanent magnet field while a rotor is constructed as a revolving armature. In addition, although the embodiments are described regarding the permanent magnet type rotating machine, the present invention may be applicable for a permanent magnet type of liner motor. In case of taking a reduction of torque pulsating precedence of output drop due to a leakage of flux between the field polar surface and the armature surface, the present invention may be applicable for a general wound-rotor field type synchronous machine.

According to the present invention, by restricting the terminal voltage by the weakening field at the high-speed region, it is possible to provide the permanent magnet type rotating machine which is capable of rotating in a wide range from low-speed to high-speed.

What is claimed is:

1. A permanent magnet type rotating machine comprising:
   a stator having a stator core provided on an inner periphery thereof with armature windings;
   a rotor core arranged coaxially with said stator and penetrating said stator;
   a plurality of permanent magnets of Nd/Fe/B alloy arranged on an outer periphery of said rotor core, said permanent magnets having arc cross sections; and
   a magnetic ring arranged between said permanent magnets and said stator to be coaxial with said stator and said rotor core;
   wherein a relationship between a thickness of said magnetic ring in the radial direction and a peripheral length of each of said permanent magnets is as follows:

$$8 < \tau/Lr < 40$$

where $\tau$: peripheral length of each permanent magnet;
   $Lr$: thickness of magnetic ring.

2. A permanent magnet type rotating machine, as claimed in claim 1, wherein said magnetic ring is positioned on outer peripheries of said permanent magnets.

3. A permanent magnet type rotating machine, as claimed in claim 1, wherein said magnetic ring comprises stacked silicon steel plates.

4. A permanent magnet type rotating machine comprising:
   a stator having a stator core provided on an inner periphery thereof with armature windings;
   a rotor core arranged coaxially with said stator and penetrating said stator;
   a plurality of permanent magnets arranged on an outer periphery of said rotor core, said permanent magnets having arc cross sections; and
   a magnetic ring arranged between said permanent magnets and said stator to be coaxial with said stator and said rotor core;
   wherein said magnetic ring comprises a magnetic material having a relative permeability that is more than 100 when magnetic flux density through said magnetic material is between 0.5 T and 0.8 T and a relative permeability that is less than 100 when said magnetic flux density is more than 1.6 T.

5. A permanent magnet type rotating machine, as claimed in claim 1, further comprising interpole magnets which are inserted between said permanent magnets and each of which is magnetized in a direction perpendicular to a magnetizing direction of said permanent magnets.

6. A permanent magnet type rotating machine, as claimed in claim 1, wherein said magnetic ring is positioned on outer peripheries of said permanent magnets and comprises silicon steel plates.

7. A permanent magnet type rotating machine comprising:
   a stator having a stator core provided on an inner periphery thereof with armature windings;
   a rotor core arranged coaxially with said stator and penetrating said stator;
   a plurality of permanent magnets arranged on an outer periphery of said rotor core, said permanent magnets having arc cross sections; and
   a magnetic ring arranged between said permanent magnets and said stator to be coaxial with said stator and said rotor core;

wherein a thickness of said magnetic ring is established in such a manner that an amount of interlinkage flux at nearly zero in current, which may be caused under either a failure condition where a flux-weakening control cannot be operated or a no-load or light load condition, is smaller than an amount of interlinkage flux under a load condition of flowing current.

8. A permanent magnet type rotating machine, as claimed in claim 1, wherein said magnetic ring is positioned on outer peripheries of said permanent magnets and comprises a magnetic material whose saturation magnetic flux density is smaller than that of a silicon steel plate.

9. A permanent magnet type rotating machine, as claimed in claim 1, wherein said magnetic ring comprises a magnetic material having a relative permeability that is more than 100 when magnetic flux density through said magnetic material is between 0.5 T and 0.8 T and a relative permeability that is less than 100 when said magnetic flux density is more than 1.6 T.

10. A permanent magnet type rotating machine, as claimed in claim 1, wherein said magnetic ring comprises a dust core of magnetic metal powder and resin compounds serving both to insulate and to join said magnetic metal powder.

11. A permanent magnet type rotating machine, as claimed in claim 1, wherein said magnetic ring comprises a magnetic material of ferrite.

12. A permanent magnet type rotating machine, as claimed in claim 1, wherein said magnetic ring comprises an amorphous magnetic material.

13. A permanent magnet type rotating machine, as claimed in claim 8, wherein a thickness of said magnetic ring is established in such a manner that an amount of interlinkage flux at nearly zero in current, which may be caused under either a failure condition where a flux-weakening control cannot be operated or a no-load or light load condition, is smaller than an amount of interlinkage flux under a load condition of flowing current.

14. A permanent magnet type rotating machine, as claimed in claim 1, wherein said magnetic ring is positioned on an inner surface of said stator core, opposing said rotor.

15. A permanent magnet type rotating machine, as claimed in claim 14, wherein said magnetic ring comprises any one of: silicon steel plates; magnetic material whose saturation magnetic flux density is smaller than that of a silicon steel plate; magnetic material whose relative permeability is more than 100 when magnetic flux density thereof is from 0.5 T to 0.8 T and whose relative permeability is less than 100 when magnetic flux density thereof is more than 1.6 T; a dust core of magnetic metal powder and resin compounds serving both to insulate and to join said magnetic metal powder; ferrite; and amorphous magnetic material.

16. A permanent magnet type rotating machine, as claimed in claim 12, wherein said magnetic ring includes a plurality of elongated pieces laid to overlap each other in a circumferential direction of said rotor, said elongated pieces extending in an axial direction of said rotor.

17. A permanent magnet type rotating machine, as claimed in claim 12, wherein said magnetic ring includes a plurality of ring-shaped thin plates laid to overlap each other in an axial direction of said rotor.

18. A permanent magnet type rotating machine comprising:

a stator having a stator core provided on an inner periphery thereof with teeth interposing slots therebetween; armature windings accommodated in said slots, respectively;

magnetic wedges, each arranged on an openings of one of said slots, said magnetic wedges and said armature windings constituting an armature;

a rotor core arranged coaxially with said stator; and a plurality of permanent magnets of Nd/Fe/B alloy arranged on an outer periphery of said rotor core, said permanent magnets having arc cross sections, wherein a relationship between a thickness of said magnetic wedge in a radial direction and a peripheral length of each of said permanent magnets is as follows:

$$8 < \tau/Lr < 40$$

where τ: peripheral length of each permanent magnet;
Lr: thickness of magnetic wedge.

19. A permanent magnet type rotating machine, as claimed in claim 18, wherein said magnetic wedges comprises any one of: silicon steel plates; magnetic material whose saturation magnetic flux density is smaller than that of a silicon steel plate; magnetic material whose saturation magnetic flux density is smaller than that of said rotor core; magnetic material whose relative permeability is more than 100 when magnetic flux density thereof is from 0.5 T to 0.8 T and whose relative permeability is less than 100 when magnetic flux density thereof is more than 1.6 T; a dust core of magnetic metal powder and resin compounds serving both to insulate and to join said magnetic metal powder; ferrite; and amorphous magnetic material.

20. A permanent magnet type rotating machine, as claimed in claim 18, wherein each of said magnetic wedges consists of a plurality of elongated pieces laid to overlap each other in a circumferential direction of said rotor, said elongated pieces extending in an axial direction of said rotor.

21. A permanent magnet type rotating machine, as claimed in claim 18, wherein each of said magnetic wedges consists of a plurality of rectangular-shaped thin plates laid to overlap each other in an axial direction of said rotor.

22. A permanent magnet type rotating machine comprising:

a stator having a stator core provided on an inner periphery thereof with armature windings;

a rotor core arranged coaxially with said stator and penetrating said stator;

a plurality of permanent magnets of Nd/Fe/B alloy arranged on an outer periphery of said rotor core, said permanent magnets having arc cross sections; and magnetic discs mounted on side faces of one of said stator and said rotors wherein a relationship between a thickness of each of said magnetic discs in an axial direction and a peripheral length of each of said permanent magnets is as follows:

$$8 < \tau/Lr < 40$$

where τ: Peripheral length of each permanent magnet;
Lr: thickness of magnetic disc.

23. A permanent magnet type rotating machine comprising:

a stator having a stator core provided on an inner periphery thereof with armature windings, said stator core comprising a magnetic material;

a rotor core arranged coaxially with said stator and penetrating said stator, said rotor core comprising a magnetic material;

a plurality of permanent magnets of Nd/Fe/B alloy arranged on an outer periphery of said rotor core, at intervals in the circumferential direction;

a plurality of magnetic members, each arranged on an outer surface of one of said permanent magnets; and end rings mounted on said rotor core at both axial ends thereof and spaced apart from axial ends of said magnetic members through gaps, said end rings comprising a magnetic material and being magnetically joined to said rotor core.

24. A permanent magnet type rotating machine, as claimed in claim 23, wherein each of said magnetic members comprises a silicon steel plate.

25. A permanent magnet type rotating machine, as claimed in claim 23, wherein each of said magnetic members comprises a Fe/Co/V alloy.

26. A permanent magnet type rotating machine, as claimed in claim 23, wherein each of said magnetic members comprises a stainless steel.

27. A permanent magnet type rotating machine, as claimed in claim 23, wherein said magnetic members comprises a dust core of magnetic metal powder and resin compounds serving both to insulate said material and to join said magnetic metal powder.

28. A permanent magnet type rotating machine, as claimed in claim 23, wherein said magnetic members comprises a ferrite.

29. A permanent magnet type rotating machine, as claimed in claim 23, wherein said magnetic members comprises an amorphous magnetic material.

30. A permanent magnet type rot machine, as claimed in claim 23, wherein each of said magnetic members consists of magnetic thin plates laminated to each other.

31. A permanent magnet type rotating machine, as claimed in claim 23, wherein said gap is occupied with a non-magnetic material.

32. An axial-gap type and permanent type rotating machine comprising:

a disc-shaped stator having a stator core provided on an inner periphery thereof with armature windings thereby providing an armature, said stator core comprising a magnetic material;

a rotor arranged to oppose said stator through a gap in an axial direction, said rotor having a rotor core comprising a magnetic material;

a plurality of permanent magnets of Nd/Fe/B alloy arranged in said rotor core at intervals in the circumferential direction;

a pair of magnetic members attached on both side faces of said permanent magnets in the axial direction; and end rings arranged apart from inner and outer circumferential surfaces of said rotor core and said magnetic members through clearances in a radial direction, respectively, said end rings comprising a magnetic material and being magnetically joined to said rotor core.

33. An axial-gap type and permanent magnet type rotating machine, as claimed in claim 32, wherein said end rings comprise a Fe/Co/V alloy.

34. An axial-gap type and permanent magnet type rotating machine, as claimed in claim 32, wherein each of said end rings consists of magnetic thin plates laminated to each other.

35. An axial-gap type and permanent magnet type rotating machine, as claimed in claim 32, wherein said clearances are occupied with non-magnetic material.

36. A permanent magnet type rotating machine comprising:

a stator having a stator core provided on an inner periphery thereof with armature windings, said stator core comprising a magnetic material;

a rotor core arranged coaxially with said stator and penetrating said stator, said rotor core comprising a magnetic material;

a plurality of permanent magnets of Nd/Fe/B alloy arranged on an outer periphery of said rotor core at intervals in the circumferential direction;

a plurality of magnetic members, each arranged on an outer surface of one of said permanent magnets; and end rings mounted on said rotor core at both axial ends thereof to contact ends of said magnetic members, said end rings comprising a magnetic material and being magnetically joined to said rotor core.

37. A permanent magnet type rotating machine, as claimed in claim 36, wherein said end rings are adapted to be magnetically joined to said rotor core through the intermediary of non-magnetic material.

38. A permanent magnet type rotating machine, as claimed in claim 36, further comprising a damper bar which penetrates said magnetic member in an axial direction thereof, wherein said damper bar has both axial ends thereof each of which is connected to a conductive short-circuit ring attached to said rotor core.

39. A permanent magnet type rotating machine, as claimed in claim 23, further comprising a magnetic ring arranged on surfaces of said permanent magnets, said magnetic ring comprising a magnetic material whose saturation magnetic flux density is lower than that of said rotor core.

40. A permanent magnet type rotating machine, as claimed in claim 23, further comprising a magnetic ring arranged on surfaces of said permanent magnets, said magnetic ring comprising a magnetic material whose relative permeability is more than 100 when magnetic flux density through said magnetic ring is from 0.5 T to 0.8 T and whose relative permeability is less than 100 when said magnetic flux density is more than 1.6 T.

41. A permanent magnet type rotating machine, as claimed in claim 23, further comprising a magnetic ring arranged on surfaces of said permanent magnets, said magnetic ring comprising a dust core of magnetic metal powder and resin compounds serving both to insulate said material and to join said magnetic metal powder.

42. A permanent magnet type rotating machine, as claimed in claim 23, further comprising a magnetic ring arranged on surfaces of said permanent magnets, said magnetic ring comprising a ferrite.

43. A permanent magnet type rotating machine, as claimed in claim 23, further comprising a magnetic ring arranged on surfaces of said permanent magnets, said magnetic ring comprising an amorphous magnetic material.

44. A permanent magnet type rotating machine, as claimed in claim 23, further comprising a magnetic ring arranged on surfaces of said permanent magnets, said magnetic ring comprising a silicon steel plate.

45. A permanent magnet type rotating machine, as claimed in claim 23, further comprising a magnetic ring arranged on the inner periphery of said stator core, said magnetic ring comprising a magnetic material whose saturation magnetic flux density is lower than that of said rotor core.

46. A permanent magnet type rotating machine, as claimed in claim 23, further comprising a magnetic ring arranged on the inner periphery of said stator core, said magnetic ring comprising a magnetic material whose relative permeability is more than 100 when magnetic flux density through said magnetic ring is from 0.5 T to 0.8 T and whose relative permeability is less than 100 when said magnetic flux density is more than 1.6 T.

47. A permanent magnet type rotating machine, as claimed in claim 23, further comprising a magnetic ring arranged on the inner periphery of said stator core, said magnetic ring comprising any one of dust core of magnetic metal powder and resin compounds serving both to insulate said material and to join said magnetic metal powder, ferrite, and amorphous magnetic material.

48. A permanent magnet type rotating machine, as claimed in claim 39, wherein each of said magnetic ring is either one of a lamination consisting of a plurality of elongated pieces laid to overlap each other in a rotational direction of said rotor, said elongated pieces extending in an axial direction of said rotor, and another lamination consisting of a plurality of annular-shaped thin plates laid to overlap each other in the axial direction of said rotor.

49. A permanent magnet type rotating machine, as claimed in claim 7, wherein said magnetic ring consists of a plurality of elongated pieces laid to overlap each other in a circumferential direction of said rotor, said elongated pieces extending in an axial direction of said rotor.

50. A permanent magnet type rotating machine, as claimed in claim 8, wherein said magnetic ring consists of a plurality of elongated pieces laid to overlap each other in a circumferential direction of said rotor, said elongated pieces extending in an axial direction of said rotor.

51. A permanent magnet type rotating machine, as claimed in claim 9, wherein said magnetic ring consists of a plurality of elongated pieces laid to overlap each other in a circumferential direction of said rotor, said elongated pieces extending in an axial direction of said rotor.

52. A permanent magnet type rotating machine, as claimed in claim 10, wherein said magnetic ring consists of a plurality of elongated pieces laid to overlap each other in a circumferential direction of said rotor, said elongated pieces extending in an axial direction of said rotor.

53. A permanent magnet type rotating machine, as claimed in claim 11, wherein said magnetic ring consists of a plurality of elongated pieces laid to overlap each other in a circumferential direction of said rotor, said elongated pieces extending in an axial direction of said rotor.

54. A permanent magnet type rotating machine, as claimed in claim 12, wherein said magnetic ring consists of a plurality of elongated pieces laid to overlap each other in a circumferential direction of said rotor, said elongated pieces extending in an axial direction of said rotor.

55. A permanent magnet type rotating machine, as claimed in claim 7, wherein said magnetic ring consists of a plurality of ring-shaped thin plates laid to overlap each other in an axial direction of said rotor.

56. A permanent magnet type rotating machine, as claimed in claim 8, wherein said magnetic ring consists of a plurality of ring-shaped thin plates laid to overlap each other in an axial direction of said rotor.

57. A permanent magnet type rotating machine, as claimed in claim 9, wherein said magnetic ring consists of a plurality of ring-shaped thin plates laid to overlap each other in an axial direction of said rotor.

58. A permanent magnet type rotating machine, as claimed in claim 10, wherein said magnetic ring consists of a plurality of ring-shaped thin plates laid to overlap each other in an axial direction of said rotor.

59. A permanent magnet type rotating machine, as claimed in claim 11, wherein said magnetic ring consists of a plurality of ring-shaped thin plates laid to overlap each other in an axial direction of said rotor.

60. A permanent magnet type rotating machine, as claimed in claim 12, wherein said magnetic ring consists of a plurality of ring-shaped thin plates laid to overlap each other in an axial direction of said rotor.

61. A permanent magnet type rotating machine, as claimed in claim 23, wherein a relationship between a thickness of said end ring in the radial direction and a peripheral length of each of said permanent magnets is as follows:

$$8 < \tau/Lr < 40$$

where $\tau$: peripheral length of each permanent magnet;
Lr: thickness of end ring.

62. An axial-gap type and permanent magnet type rotating machine, as claimed in claim 32, wherein a relationship between a thickness of said end ring in the radial direction and a peripheral length of each of said permanent magnets is as follows:

$$8 < \tau/Lr < 40$$

where $\tau$: peripheral length of each permanent magnet;
Lr: thickness of end ring.

63. A permanent magnet type rotating machine, as claimed in claim 36, wherein a relationship between a thickness of said end ring in the radial direction and a peripheral length of each of said permanent magnets is as follows:

$$8 < \tau/Lr < 40$$

where $\tau$: peripheral length of each permanent magnet;
Lr: thickness of end ring.

64. A permanent magnet type rotating machine as claimed in claim 23, wherein said end ring comprises any one of soft steel, carbon steel, silicon steel, Fe/Co/V alloy, magnetic stainless steel and amorphous magnetic material.

65. An axial-gap type and permanent magnet type rotating machine as claimed in claim 32, wherein said end ring comprises any one of soft steel, carbon steel, silicon steel, Fe/Co/V alloy, magnetic stainless steel and amorphous magnetic material.

66. A permanent magnet type rotating machine as claimed in claim 36, wherein said end ring comprises any one of soft steel, carbon steel, silicon steel, Fe/Co/V alloy, magnetic stainless steel and amorphous magnetic material.

67. A permanent magnet type rotating machine comprising:

a stator having a stator core provided on an inner periphery thereof with armature windings;

a rotor core arranged coaxially with said stator and penetrating said stator;

a plurality of permanent magnets of Nd/Fe/B alloy arranged on an outer periphery of said rotor core, said permanent magnets having arc cross sections;

a gap between said stator and said permanent magnets;

a magnetic ring arranged between said permanent magnets and said stator to be coaxial with said stator and said rotor core; and interpole magnets inserted between said permanent magnets, each interpole magnet being magnetized in a direction perpendicular to a magnetizing direction of said permanent magnets, said interpole magnets being disposed adjacent to respective portions of said magnetic ring, whereby said interpole magnets are magnetically saturated and increase magnetic flux reaching the stator core through the gap.

* * * * *